United States Patent
Batikoff et al.

(10) Patent No.: US 9,467,040 B2
(45) Date of Patent: Oct. 11, 2016

(54) SYSTEM, A METHOD AND A COMPUTER PROGRAM PRODUCT FOR CONTROLLING ELECTRIC POWER SUPPLY

(71) Applicant: ELTA SYSTEMS LTD., Ashdod (IL)

(72) Inventors: Enrique Batikoff, Nes Tziona (IL); Robert Zelig, Ashdod (IL)

(73) Assignee: ELTA SYSTEMS LTD., Ashdod (IL)

( * ) Notice: Subject to any disclaimer, the term of this patent is extended or adjusted under 35 U.S.C. 154(b) by 221 days.

(21) Appl. No.: 14/369,768

(22) PCT Filed: Dec. 6, 2012

(86) PCT No.: PCT/IL2012/050513
§ 371 (c)(1),
(2) Date: Jun. 30, 2014

(87) PCT Pub. No.: WO2013/098814
PCT Pub. Date: Jul. 4, 2013

(65) Prior Publication Data
US 2014/0354245 A1     Dec. 4, 2014

(30) Foreign Application Priority Data
Dec. 29, 2011 (IL) .......................................... 217263

(51) Int. Cl.
*G05F 1/20* (2006.01)
*H02M 1/42* (2007.01)
*H02M 3/158* (2006.01)
*H02M 7/217* (2006.01)

(52) U.S. Cl.
CPC ........... *H02M 1/4208* (2013.01); *H02M 3/158* (2013.01); *H02M 3/1582* (2013.01); *H02M 7/217* (2013.01); *H02M 2001/4291* (2013.01)

(58) Field of Classification Search
CPC .......................................... H02M 2001/4291

USPC .......................................... 323/271–289, 351
See application file for complete search history.

(56) References Cited

U.S. PATENT DOCUMENTS

| | | | |
|---|---|---|---|
| 6,037,755 A | 3/2000 | Mao et al. | |
| 6,166,527 A | 12/2000 | Dwelley et al. | |
| 7,564,706 B1 | 7/2009 | Herbert | |
| 2006/0284606 A1 | 12/2006 | Chen et al. | |
| 2009/0201003 A1 | 8/2009 | Kobori et al. | |
| 2009/0262556 A1 | 10/2009 | Tomiyoshi et al. | |
| 2010/0102787 A1* | 4/2010 | Zelig | H02M 3/1582 323/282 |
| 2010/0148739 A1 | 6/2010 | Khaligh et al. | |
| 2011/0006969 A1* | 1/2011 | Batikoff | H02J 1/102 343/904 |

* cited by examiner

*Primary Examiner* — Adolf Berhane
*Assistant Examiner* — Nusrat Quddus
(74) *Attorney, Agent, or Firm* — Browdy and Neimark, PLLC

(57) ABSTRACT

A method for controlling electric power supply, the method comprising: (a) controllably down converting by a step-down power converter entry voltage from a power source and preventing up-conversion by a step-up power converter, substantially when the entry voltage is larger than a measured exit voltage and is in compliance with a first criterion that is based on the entry voltage and on the measured exit voltage; wherein the measured exit voltage is measured at an exit of both step-up power converter and the step-down power converter; and (b) controllably up converting by the step-up power converter the entry voltage and preventing down-conversion by the step-down power converter, substantially when the entry voltage is lower than the measured exit voltage and is in compliance with a second criterion that is based on the entry voltage and on the measured exit voltage.

30 Claims, 13 Drawing Sheets

510 controllably down converting entry voltage from a power source by a step-down power converter and preventing up-conversion by a step-up power converter, substantially when the entry voltage is larger than a measured exit voltage and is in compliance with a first criterion that is based on the entry voltage and on the measured exit voltage; wherein the measured exit voltage is measured at an exit of both step-up power converter and the step down power converter

520 controllably up converting the entry voltage by the step-up power converter and preventing down-conversion by the step-down power converter, substantially when the entry voltage is lower than the measured exit voltage and is in compliance with a second criterion that is based on the entry voltage and on the measured exit voltage

500
FIG. 8

SYSTEM, A METHOD AND A COMPUTER PROGRAM PRODUCT FOR CONTROLLING ELECTRIC POWER SUPPLY

RELATED APPLICATIONS

This application claims priority from Israeli patent application serial number 217263, filing date 29 Dec. 2011.

FIELD OF THE INVENTION

This invention relates to systems, methods, and computer program products for controlling electric power supply.

BACKGROUND OF THE INVENTION

U.S. Pat. No. 7,564,706B discusses a power factor corrected (PFC) AC-DC converter which has a modified boost input and a modified buck output. The boost switch returns to the output, not to ground. A third switch connects to the input. This allows much of the input current to pass through the converter to the output. There is no input current measurement, but nearly ideal power factor correction is achieved through "natural modulation." A preferred PFC AC-DC converter uses a variable DC-DC transformer on its output, as a post regulator, to provide dielectric isolation and to provide voltage level shifting. The output of the PFC AC-DC converter has the control characteristics of a buck converter, so it is a natural mate for the variable DC-DC transformer. The variable DC-DC transformer controls the output voltage for nominal and low input voltage. The AC-DC buck converter limits over-voltage transients.

SUMMARY OF THE INVENTION

A controlled electric power supply system, the system comprising: (a) a step-down power converter; (b) a step-up power converter; and (c) a controller, coupled to the step-down power converter and to the step-up power converter, configured to: (i) control down-conversion by the step-down power converter of entry voltage from a power source and prevent up-conversion by the step-up power converter, substantially when the entry voltage is larger than a measured exit voltage and is in compliance with a first criterion that is based on the entry voltage and on the measured exit voltage; wherein the measured exit voltage is measured at an exit of both step-up power converter and the step-down power converter; and (ii) control up-conversion by the step-up power converter of the entry voltage and prevent down-conversion by the step-down power converter, substantially when the entry voltage is lower than the measured exit voltage and is in compliance with a second criterion that is based on the entry voltage and on the measured exit voltage.

According to an embodiment of the invention, the controller may be configured to determine that the entry voltage is in compliance with the first criterion substantially when the entry voltage exceeds a first voltage threshold that is based on the measured exit voltage and is higher than the measured exit voltage, and to determine that the entry voltage is in compliance with the second criterion substantially when the entry voltage is lower than a second voltage threshold that is based on the measured exit voltage and is lower than the measured exit voltage.

According to an embodiment of the invention, the system may further include a storage capacitor for storing energy arriving from the step-down power converter and from the step-up power converter, and for supplying stored energy to a varying load; wherein the exit voltage is measured across the storage capacitor.

According to an embodiment of the invention, at least one inductor of the system is utilized by the step-up power converter and by the step-down power converter.

According to an embodiment of the invention, the controller may be further configured to control concurrent conversion of entry voltage from the power source by the step-down power converter and by the step-up power converter, substantially when the entry voltage is in compliance with a parallel-conversion criterion that is based on the entry voltage and on the measured exit voltage and is not in compliance with the first and second criteria.

According to an embodiment of the invention, the controller may be further configured to control a maintaining of constant up-conversion rate by the step-up power converter during the concurrent conversion.

According to an embodiment of the invention, the controller may be further configured to dynamically modify down-conversion rate of the step-down power converter during an uninterrupted down-conversion of the entry voltage.

According to an embodiment of the invention, the controller may be further configured to dynamically modify up-conversion rate of the step-up power converter during an uninterrupted up-conversion of the entry voltage.

According to an embodiment of the invention, the controller may be further configured to dynamically modify a conversion rate of at least one of the step-up power converter and the step-down power converter, based on a measured entry current and on a measured exit voltage, for applying power factor correction of the system.

According to an embodiment of the invention, the controller may be configured to control duty cycles of the step-down power converter and of the step-up power converter for gradually changing the power level sourced from the power source after a sudden change in the load power level.

According to an embodiment of the invention, at least one of the step-down power converter and the step-up power converter may be operable to convert in a controllable rate the entry voltage which is varying over time.

According to an embodiment of the invention, the power source may be a three phase power source, wherein the step-up and the step-down power converters are connected to a first pair of phases of the power source.

According to an embodiment of the invention, the controlled electric power supply system may further include a second step-down power converter and a second step-up power converter which are connected to a second pair of phases of the power source that is different from the first pair; wherein the controlled electric power supply system further includes a third step-down power converter and a third step-up power converter which are connected to a third pair of phases of the power source that is different from the first pair and from the second pair; wherein at least one controller of the system which is coupled to the second step-down power converter and to the second step-up power converter is configured to: (a) control down-conversion by the second step-down power converter of second entry voltage from the power source and prevent up-conversion by the second step-up power converter, substantially when the second entry voltage is larger than a second measured exit voltage and is in compliance with a third criterion that is based on the second entry voltage and on the second measured exit voltage; wherein the second measured exit voltage is measured at an exit of both second step-up power converter and the second step-down power converter; and (b) control up-conversion by the second step-up power converter of the second entry voltage and prevent down-conversion by the second step-down power converter, substantially when the second entry voltage is lower than the second measured exit voltage and is in compliance with a fourth criterion that is based on the second entry voltage and on the second measured exit voltage; wherein at least one controller of the system which is coupled to the third step-down power converter and to the third step-up power converter is configured to: (c) control down-conversion by the third step-down power converter of third entry voltage from the power source and prevent up-conversion by the third step-up power converter, substantially when the third entry voltage is larger than a third measured exit voltage and is in compliance with a fifth criterion that is based on the third entry voltage and on the second measured exit voltage; wherein the third measured exit voltage is measured at an exit of both third step-up power converter and the third step-down power converter; and (d) control up-conversion by the third step-up power converter of the third entry voltage and prevent down-conversion by the third step-down power converter, substantially when the third entry voltage is lower than the third measured exit voltage and is in compliance with a sixth criterion that is based on the third entry voltage and on the third measured exit voltage.

According to an embodiment of the invention, the controller may be further configured to control deactivation of the step-down power converter when controlling the up-conversion by the step-up power converter. For example, the controller may be configured to control the deactivation of the step-down power converter when the entry voltage is in compliance with a second criterion that is based on the entry voltage and on the measured exit voltage.

According to an embodiment of the invention, the controller may be further configured to control concurrent conversion of entry voltage from the power source by the step-down power converter and by the step-up power converter, when the entry voltage is higher than the second dynamically determined voltage threshold and is lower than the first dynamically determined voltage threshold.

According to an embodiment of the invention, there is provided a method for controlling electric power supply, the method including: (a) controllably down converting by a step-down power converter entry voltage from a power source and preventing up-conversion by a step-up power converter, substantially when the entry voltage is larger than a measured exit voltage and is in compliance with a first criterion that is based on the entry voltage and on the measured exit voltage; wherein the measured exit voltage is measured at an exit of both step-up power converter and the step-down power converter; and (b) controllably up converting by the step-up power converter the entry voltage and preventing down-conversion by the step-down power converter, substantially when the entry voltage is lower than the measured exit voltage and is in compliance with a second criterion that is based on the entry voltage and on the measured exit voltage.

According to an embodiment of the invention, the method may further include storing at a storage capacitor energy arriving from the step-down power converter and from the step-up power converter, and supplying stored energy from the storage capacitor to a varying load; wherein the exit voltage is measured across the storage capacitor.

According to an embodiment of the invention, the method may further include controllably concurrently converting entry voltage from the power source by the step-down power converter and by the step-up power converter, substantially when the entry voltage is in compliance with a cutoff criterion that is based on the entry voltage and on the measured exit voltage, and is not in compliance with the first and the second criteria.

According to an embodiment of the invention, the method may include maintaining a constant up-conversion rate of the step-up power converter during the controllable concurrent conversion.

According to an embodiment of the invention, the method may include dynamically modifying a down-conversion rate of the step-down power converter during an uninterrupted down-conversion of the entry voltage.

According to an embodiment of the invention, the method may include dynamically modifying an up-conversion rate of the step-up power converter during an uninterrupted up-conversion of the entry voltage.

According to an embodiment of the invention, the method may further include dynamically modifying a conversion rate of at least one of the step-up power converter and the step-down power converter, based on a measured entry current and on a measured exit voltage, for applying power factor correction of the system.

According to an embodiment of the invention, the method may include controlling duty cycles of the step-down power converter and of the step-up power converter for gradually changing the power level sourced from the power source after a sudden change in the load power level.

According to an embodiment of the invention, the controllable up-conversion and the controllable down-conversion include converting power received from a first pair of phases of the power source which is a three phase power source.

According to an embodiment of the invention, the method may further include: (a) controllably down converting by a second step-down power converter second entry voltage from the power source and preventing up-conversion by a second step-up power converter, substantially when the second entry voltage is larger than a second measured exit voltage and is in compliance with a third criterion that is based on the second entry voltage and on the second measured exit voltage; wherein the second measured exit voltage is measured at an exit of both second step-up power converter and the second step-down power converter; (b) controllably up converting by the second step-up power converter the second entry voltage and preventing down-conversion by the second step-down power converter, substantially when the second entry voltage is lower than the second measured exit voltage and is in compliance with a fourth criterion that is based on the second entry voltage and on the second measured exit voltage; (c) controllably down converting by a third step-down power converter third entry voltage from the power source and preventing up-conversion by a third step-up power converter, substantially when the third entry voltage is larger than a third measured exit voltage and is in compliance with a fifth criterion that is based on the third entry voltage and on the second measured exit voltage; wherein the third measured exit voltage is measured at an exit of both third step-up power converter and the third step-down power converter; and (d) controllably up converting by the third step-up power converter the third entry voltage and preventing down-conversion by the third step-down power converter, substantially when the third entry voltage is lower than the third measured exit voltage and is in compliance with a sixth criterion that is based on the third entry voltage and on the third measured exit voltage; wherein the second step-down power converter and the second and step-up power converter are connected to a second pair of phases of the power source that is different from the first pair; wherein the third step-down power converter and the third and step-up power converter are connected to a third pair of phases of the power source that is different from the first pair and from the second pair.

According to an embodiment of the invention, the method may further include controllably concurrently up-converting and down-converting, by a step-up/down power converter, the entry voltage.

According to an embodiment of the invention, the method may further include controlling deactivation of the step-down power converter during the controllable up-conversion.

A program storage device readable by machine, tangibly embodying a program of instructions executable by the machine to perform a method for controlling electric power supply, the method including the steps of: (a) controllably down converting by a step-down power converter entry voltage from a power source and preventing up-conversion by a step-up power converter, substantially when the entry voltage is larger than a measured exit voltage and is in compliance with a first criterion that is based on the entry voltage and on the measured exit voltage; wherein the measured exit voltage is measured at an exit of both step-up power converter and the step-down power converter; and (b) controllably up converting by the step-up power converter the entry voltage and preventing down-conversion by the step-down power converter, substantially when the entry voltage is lower than the measured exit voltage and is in compliance with a second criterion that is based on the entry voltage and on the measured exit voltage.

According to an embodiment of the invention, the instructions may further include instructions for controlling concurrent conversion of entry voltage from the power source by the step-down power converter and by the step-up power converter, substantially when the entry voltage is in compliance with a cutoff criterion that is based on the entry voltage and on the measured exit voltage, and is not in compliance with the first and the second criteria.

According to an embodiment of the invention, the instructions may further include instructions for maintaining a constant up-conversion rate of the step-up power converter during the controllable concurrent conversion.

According to an embodiment of the invention, the instructions may further include instructions for dynamically modifying a down-conversion rate of the step-down power converter during an uninterrupted down-conversion of the entry voltage.

According to an embodiment of the invention, the instructions may further include instructions for dynamically modifying an up-conversion rate of the step-up power converter during an uninterrupted up-conversion of the entry voltage.

According to an embodiment of the invention, the instructions may further include instructions for dynamically modifying a conversion rate of at least one of the step-up power converter and the step-down power converter, based on a measured entry current and on a measured exit voltage, for applying power factor correction of the system.

According to an embodiment of the invention, the instructions may further include instructions for controlling duty cycles of the step-down power converter and of the step-up power converter for gradually changing the power level sourced from the power source after a sudden change in the load power level.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 8 illustrates a method for controlling electric power supply, according to an embodiment of the invention;

Figure 1A:
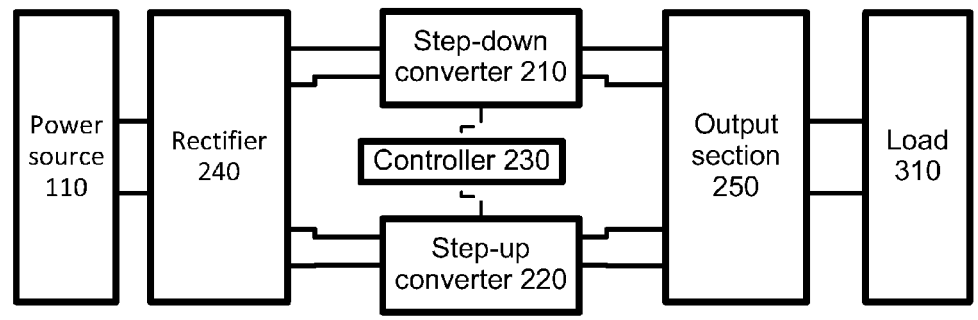
FIG. 1A is a block diagram of a controlled electric power supply system, according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "processing", "determining", "selecting" or the like, include action and/or processes of a computer that manipulate and/or transform data into other data, said data represented as physical quantities, e.g. such as electronic quantities, and/or said data representing the physical objects. The term "computer" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein may be performed by a computer specially constructed for the desired purposes or by a general purpose computer specially configured for the desired purpose by a computer program stored in a computer readable storage medium. The operations in accordance with the teachings herein may be performed by an analog and/or digital computer or controller which is specially constructed for the desired purposes or by a general purpose analog and/or digital computer or controller specially configured for the desired purpose by a computer program stored in a computer readable storage medium.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

In embodiments of the presently disclosed subject matter one or more stages illustrated in the figures may be executed in a different order and/or one or more groups of stages may be executed simultaneously and vice versa. The figures illustrate a general schematic of the system architecture in accordance with an embodiment of the presently disclosed subject matter. Each module in the figures can be made up of any combination of software, hardware and/or firmware that performs the functions as defined and explained herein. The modules in the figures may be centralized in one location or dispersed over more than one location.

FIG. 1A is a block diagram of controlled electric power supply system 200, according to an embodiment of the invention. When connected to a power source and to a load, power supply system 200 may be used to supply voltage from source 110 (which may or may not be a part of system 200 itself) towards a load 310 (which also may or may not be a part of system 200 itself).

For the purpose of discussion, it is assumed that source 110 is an alternating current (AC) source outputting power at a sinusoidally alternating voltage, such as a two-phase AC source. It will however be clear to a person who is of skill in the art that the systems and methods disclosed herein may be implemented with a wide variety of other types of power sources, mutatis mutandis. For example, source 110 may be an imperfect AC source whose output is not a perfect sinusoidal voltage, source 110 may be a sinusoidal voltage source which also provided power to one or more additional loads, wherein such a provision results in a non-sinusoidal provisioning of power by source 110, and so on.

Load 310 may consume power in an uneven manner, such as in a pulsating manner or in an irregular manner. While load 310 is not necessarily a pulsating load, it will be also referred to as "pulsating load 310" by way of example, in order to clarify and simplify the disclosure. If load 310 does not consume power in an even manner, connecting load 310 to source power from source 110 directly would be inefficient. For example, if load 310 has a duty cycle of 30% and source 10 KW on the active part of the cycle, a source connected directly to load 310 would be required to provide 10 KW, while the over-all power requirements of load 310 are merely 3 KW. Moreover, consumption of power directly from source 110 by pulsating load 310 may result in phase differences between current and voltage in the source 110, and thus for reactive power in the circuit, which lowers the efficiency of the circuit.

It is noted that load 310 may be controlled by controller 230, or by another controller, denoted external controller 330. The external controller 330 may belong, for example, to a system which includes load 310, and which may be a separate system than system 200.

System 200 may be implemented to serve a wide range of load types of load 310. For example, load 310 may be a high power microwave transmitter which operates in pulses (e.g. with power level exceeding 10 Kw, 100 Kw and even 1 Mw), a low power microwave transmitter, a pulsed laser, a laser modulator, an antenna (e.g. a cellular telephony antenna), a cooling system, an IR heating system, a distributed array of power sources, and so on. While load 310 may be a high-power load, consuming hundreds or thousands (and even more) of watts, this is not necessarily so, and system 200 may also serve loads of lower voltages.

Figure 1B:
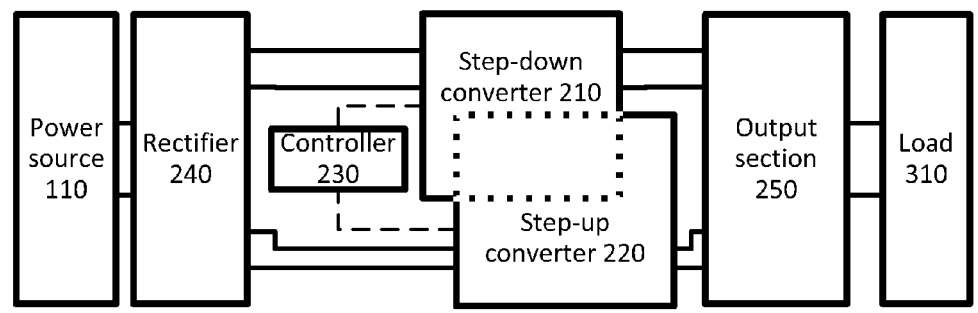
FIG. 1B is a block diagram of a controlled electric power supply system, according to an embodiment of the invention.

System 200 includes a step-down power converter 210 and a step-up power converter 220. Step-down power converter 210 is also referred to as a "Buck" power converter, and, when active, it outputs a direct current (DC) voltage whose magnitude is smaller than voltage inputted to the step-down power converter. Step-up power converter 220 is also referred to as a "Boost" power converter, and, when active, it outputs DC voltage whose magnitude is greater than voltage inputted to the step-up power converter. While the step-down and step-up power converters 210 and 220 illustrated are widely accepted in the art as such converters, it will be clear to a person who is of skill in the art that other step-down or step-up power converters may be implemented. As discussed below in greater detail, power converters 210 and 220 may share some components and circuitry, as represented by FIG. 1B.

While power may be provided to any of the converters 210 and 220 directly from source 110, this is not necessarily so. For example, in the system illustrated in FIGS. 1, 3, and 5, AC current which is provided by source 210 is rectified to DC current by rectifier 240 before it is provided by any of the converters 210 and 220. For example, rectifier 240 may be a full wave rectifier (such as the one illustrated in FIG. 3). However, other rectifiers which are known in the art may be implemented. For example a two way rectifier operating on one phase or two phases or a triple star rectifier may be implemented.

It is noted that converter 210 (and/or converter 220) may receive DC voltage from a rectifier not shared by the other converter, and possibly also include such a rectifier. Additionally, other preliminary circuits apart from a rectifier (or in addition thereto) may be implemented for altering the current by which power is provided to one or both of the converters 210 and 220.

Controller 230 of system 200 is connected to step-down power converter 210 as well as to step-up power converter 220 and controls the operation of both of them. The control of the buck and of the boost converters 210 and 220 is based on a first criterion and a second criterion (respectively), each of which is based on the entry voltage and on the exit voltage. For example, the control of the buck and of the boost converters 210 and 220 may be based on dynamically determined respective voltage thresholds (i.e. one for the step-down-conversion and another for the step-up-conversion), while both of these thresholds are determined based on a measured exit voltage which is measured at an exit of both the buck and the boost convertors 210 and 220 (either directly at an output of those circuits, or mediated from such outputs by additional circuitry. That is, it is measured "downstream" from any of these converters, closer to load 310). Referring to the example of FIG. 3, the exit voltage may be measured over capacitor C2.

Generally, system 200 may include a storage capacitor (e.g. as part of output section 250, capacitor C2, and so on) for storing energy arriving from step-down power converter 210 and from step-up power converter 220 (operating separately or in parallel), and for supplying stored energy to load 310 (wherein as aforementioned, load 310 may be a varying load whose energy consumption level is not constant over time). In such a case, the exit voltage may be measured across the storage capacitor.

Continuing the example in which capacitor C2 (or another moderating circuitry) is implemented at the exit of converters 210 and 220, it is noted that load 310 consumes power from capacitor C2, which is charged from source 110, via the intermediation of controlled upstream circuitry such as converters 210 and 220. As load 310 consumes power in a non-constant rate, the charging level of capacitor C2 changes with time—and likewise the exit voltage measured over it. The voltage thresholds on which the control of converters 210 and 210 is based therefore also change dynamically.

It should be noted that while capacitors which are positioned before the loads are used in the art, implementing the proposed system 200 (and/or the proposed method 500) enables reduction of the required capacity of such a capacitor by a very significant factor. Reduction of the required capacity by a factor of at least 30-100 (e.g. requiring a significantly smaller capacitor C2 than would be required in prior art solutions) is enabled.

The current supplied to load 310 from the step-down and/or step-up converters 210 and 220 (whether via capacitor such as C2 or not) may be further regulated by a regulator 320. Regulator 320 may be a DC/DC regulator. Regulator 320 may be used for regulating the voltage supplied to load 320. Various types of regulators which may be used for such regulation are known in the art. One possible implementation for regulator 320 is exemplified in FIG. 5, in which regulator 320 includes a capacitor C3 and a step-down power converter 322 (other than step-down converter 310). The output voltage of regulator 320 may be a constant voltage (while it may receive a dynamic incoming voltage). The output current of regulator 320 may be a pulsed current, as sourced by load 310. It is noted that the incoming voltage to regulator 320 may be a dynamic one, e.g. when controller 230 controls converters 210 and 220 so as to keep the power consumption from source 110 substantially constant, which may be at the expense of keeping the exit voltage constant.

Referring to output section 250 as a whole, it is noted that some or all of the aforementioned functionalities of output section would be implemented as part of a device which includes load 310, and not as part of power supply system 200 (as in the options previously discussed). The decision of where to implement each component may depend on the implemented devices, on the environment in which those devices are designed to be utilized, and so forth.

As aforementioned, controller 230 controls the operation of both step-down power converter 210 and step-up power converter 220. Especially, controller 230 is configured to control down-conversion by step-down power converter 210 of entry voltage from power source 110 and to prevent up-conversion by the step-up power converter, substantially when the entry voltage is larger than a measured exit voltage and is in compliance with a first criterion that is based on the entry voltage and on the measured exit voltage.

Figure 2A:
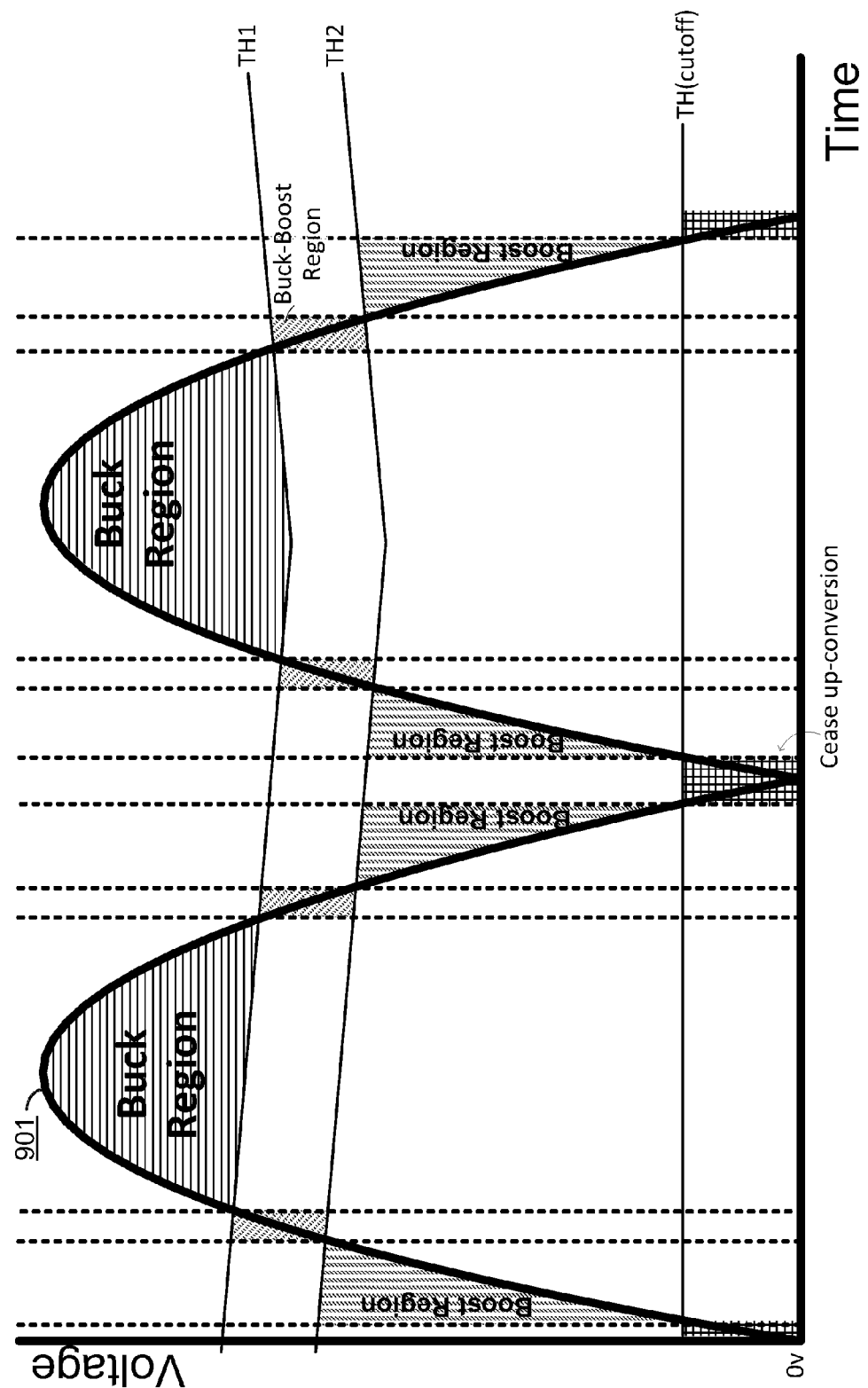
FIGS. 2A and 2B illustrate entry voltage as a function of time, in different implementations of the invention.
Figure 2B:
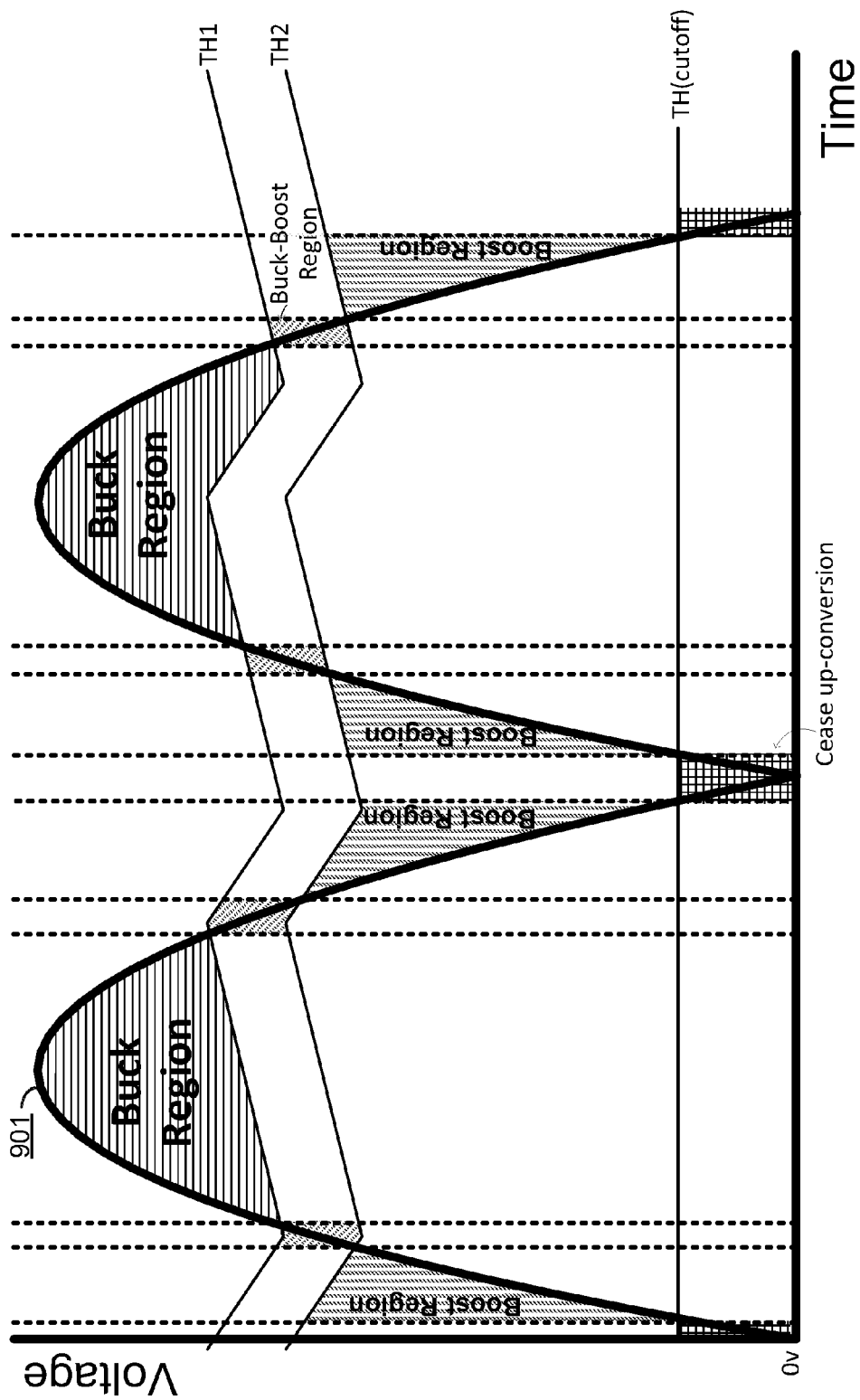

In some implementations, the first criterion is met when the entry voltage exceeds a first dynamically determined voltage threshold (TH1) that is based on the measured exit voltage and which is larger than the measured exit voltage (e.g. as exemplified in FIGS. 2A and 2B). An example for a dynamically determined voltage threshold that is larger than the measured exit voltage is Threshold=$1.1 \cdot V_{exit}$. For example, controller 230 may be configured to control the down-conversion of the entry voltage and to prevent the up-conversion substantially when the entry voltage exceeds the first dynamically determined voltage threshold (TH1).

It should be noted that in other implementations, other criteria may be used as the first criterion. Such criteria may be an equivalent of the aforementioned first criterion implementing the first dynamically determined threshold, or may be different therefrom. In some equivalent criteria, the first dynamic threshold is not determined directly, but compliance with the condition occurs when the entry voltage exceeds the first dynamic threshold as determined.

Optionally, controller 230 may be configured to control down-conversion of the entry voltage by step-down power converter 210 and to prevent up-conversion by the step-up power converter whenever the entry voltage is larger than a measured exit voltage and is in compliance with a first criterion that is based on the entry voltage and on the measured exit voltage. However, in some scenarios the down-conversion (and/or prevention of up-conversion) is not done in every moment when the entry voltage is in compliance with the first criterion. This may result from inaccuracies or deficiencies in the system, but may also be planned. For example, some tolerance may be allowed when the compliance with the first condition changes rapidly (e.g. when the entry voltage is very close to the first dynamically determined threshold, sometimes just above it and sometimes just below it).

The ratio between the durations in which the first criterion is in compliance with and the duration in which controller 230 controls the down-conversion and prevents the up-conversion may vary, and may depend on the specifics of a given implementation. For example, controller 230 may control the down-conversion and prevent the up-conversion for at least 70% of the time in which the first criterion is met, for at least 80% of that time, for at least 90%, for at least 95% of that time, or comply with other ratio requirements.

Additionally, controller 230 is further configured to control up-conversion by step-up power converter 210 of the entry voltage (or of other entry voltage from power source 110, e.g. if a different rectifier is implemented), and to prevent down-conversion by the step-down power converter, substantially when the entry voltage is lower than the measured exit voltage and is in compliance with a second criterion that is based on the entry voltage and on the measured exit voltage.

In some implementations, the second criterion is met when the entry voltage is lower than a second dynamically determined voltage threshold (TH2) that is based on the measured exit voltage and which is lower than the measured exit voltage (e.g. as exemplified in FIGS. 2A and 2B). An example for a dynamically determined voltage threshold that is lower than the measured exit voltage is Threshold=$0.9 \cdot V_{exit}$. For example, controller 230 may be configured to control the up-conversion of the entry voltage by step-up power converter 210 and to prevent the down-conversion by the step-down power converter 220 substantially when the entry voltage is lower than a second dynamically determined voltage threshold (TH2) that is based on the measured exit voltage and is lower than the measured exit voltage.

It should be noted that in other implementations, other criteria may be used as the second criterion. Such criteria may be an equivalent of the aforementioned second criterion implementing the second dynamically determined threshold, or may be different therefrom. In some equivalent criteria, the second dynamic threshold is not determined directly, but compliance with the condition occurs when the entry voltage is lower than the second dynamic threshold as determined.

Optionally, controller 230 may be configured to control up-conversion of the entry voltage by step-up power converter 220 and to prevent down-conversion by the step-down power converter 210 whenever the entry voltage is lower than a measured exit voltage and is in compliance with a second criterion that is based on the entry voltage and on the measured exit voltage. However, in some scenarios the up-conversion (and/or prevention of down-conversion) is not done in every moment when the entry voltage is in compliance with the second criterion. This may result from inaccuracies or deficiencies in the system, but may also be planned. For example, some tolerance may be allowed when the compliance with the second condition changes rapidly (e.g. when the entry voltage is very close to the second dynamically determined threshold, sometimes just above it and sometimes just below it).

The ratio between the durations in which the second criterion is in compliance with and the duration in which controller 230 controls the up-conversion and prevents the down-conversion may vary, and may depend on the specifics of a given implementation. For example, controller 230 may control the up-conversion and prevent the down-conversion for at least 70% of the time in which the second criterion is met, for at least 80% of that time, for at least 90%, for at least 95% of that time, or comply with other ratio requirements.

As will be discussed below in more detail, the second criterion may also pertain to a lower boundary of voltage, the cut-off voltage. Also, the first criterion and/or the second criterion may include other conditions for compliance with, either directly related to voltage or not so.

While some of the examples below pertain to implementations utilizing such first and second thresholds, the invention is by no way limited to such implementations. Other implementations may include equivalent criteria (without directly determining the first and/or the second thresholds), but may also utilize other criteria altogether.

For example, additional criteria which may be implemented as part of the first and/or the second criterion pertain to overall exit voltage limitation. This may be facilitated by comparing the exit voltage to an additional (possibly static) threshold. For example, if the exit voltage (e.g. the voltage over capacitor C2) exceeds a predefined limit, the power conversion may be stopped. This may occur for example when the load is being shut down. In another example, if the exit voltage falls below another predefined limit, the power conversion may be switched to constant up-conversion, and the power consumption level of the load may be modified to prevent damage to the electrical systems.

Referring to FIGS. 2A and 2B which illustrate entry voltage (denoted 901) as a function of time, in different implementations which differ at least in the frequency of the pulsed load 310 with respect to that of the AC power source 110. This exemplary entry voltage is a result of a fully-rectified one-phase sinusoidal voltage that may be provided by source 110. It is however noted that such an entry voltage 901 is merely one example, and that other voltages may be implemented. Significantly, it should be noted that the entry voltage is not necessarily symmetrical or repetitive, especially as interferences may occur. As can be seen, the entry voltage may vary with time.

The two thresholds TH1 and TH2 may also vary in time, as those thresholds are dynamic (and possibly also dynamically determined). As aforementioned, those thresholds are responsive to the measured exit voltage. Referring to the example of FIG. 3, the exit voltage may be measured over capacitor C2. Since the exit voltage may vary with time (especially since load 310 may consume power in an uneven manner over time, e.g. in a pulsating manner), the thresholds may also vary with time.

In implementations in which the first threshold TH1 is used as part of the first criterion, substantially when (and possibly whenever) entry voltage 901 exceeds the higher threshold TH1, controller 230 is in a first control state (also referred to as a "Buck control state", which occurs in the examples of FIGS. 2A and 2B at the time indicated as "Buck region") in which it controls down-conversion by step-down power converter 210 and prevents up-conversion by step-up power converter 220.

In implementations in which the second threshold TH1 is used as part of the second criterion, substantially when (and possibly whenever entry voltage 901 is lower than the lower threshold TH2, controller 230 is in a second control state (also referred to as "boost control state", which occurs in the examples of FIGS. 2A and 2B at the time indicated as "Boost region") in which it controls up-conversion by step-up power converter 220 of the entry voltage and prevents down-conversion by step-down power converter 210. In some implementations, the controller may stop the up-conversion even when the entry voltage is lower than the second threshold TH2, as will be explained in more detail below, and as exemplified by the area denoted "Cease up-conversion".

While first threshold TH1 and second threshold TH2 may differ from each other (e.g. as illustrated), in other implementations only one threshold may be implemented, in which case TH1=TH2. If indeed thresholds TH1 and TH2 differ from one another, controller 230 may apply a different control scheme in different implementations of the invention. For example, in at least part of this intermediate region, controller 230 may still be in the first or in the second control states. Also, in at least part of this intermediate region controller 230 may be in a third control state (also referred to as "buck-boost control state", which occurs in the examples of FIGS. 2A and 2B on the time indicated as "Buck-Boost region") in which it controls up-conversion by step-up power converter 220 and in parallel controls down-conversion by step-down power converter 210.

Generally, controller 230 may be further configured to control a concurrent conversion of entry voltage from power source 110 by step-down power converter 210 and by step-up power converter 220 (e.g. when at the third control state), substantially when the entry voltage is in compliance with a parallel-conversion criterion—e.g. when the entry voltage is higher than the second dynamically determined voltage threshold TH2 and is lower than the first dynamically determined voltage threshold TH1. Controller 230 may further be configured to control, during such a concurrent conversion, a maintaining of a substantially constant up-conversion rate by step-up power converter 220 (e.g. by maintaining a duty cycle of a boost converter substantially constant). The down-conversion rate of step-down converter 220 may be controllably modified during that time by controller 230.

While the concurrent step-up and step-down-conversion may be implemented by the aforementioned disclosed converters 210 and 220, in other implementations system 200 may further include a step-up/down power converter (not illustrated) other than converters 210 and 220, wherein controller 230 is further configured to selectively control concurrent step-up and step-down-conversion by that step-up/down power converter when in the third control state (and possibly also to prevent conversion by converters 210 and 220 during such time).

If implemented, the thresholds TH1 and TH2 may be determined in different ways, and while they are based on the measured exit voltage, in other implementations at least one of these thresholds may be based also on additional measured parameters (e.g. information pertaining to a state of load 310, information pertaining to a state of power source 110, etc.).

In various possible implementations, each one of the thresholds may linearly depend on the measured exit voltage (denoted Vexit), such as $TH1=k1 \cdot Vexit+a1$, may depend on a power of the exit voltage (e.g. $TH1=k1 \cdot (Vexit^{p1})+a1$), on an exponent of it (e.g. $TH1=k1 \cdot e^{Vexit}+a1$), and so forth. In the example below, $TH1=K1 \cdot Vexit$, while $TH2=k2 \cdot Vexit$. It is noted that those two thresholds may be determined by different equations (and not only by different parameters), as long as TH1>TH2 for all possible values of Vexit.

In a possible implementation, threshold TH1 may be determined as $TH1=k1 \cdot Vexit$ and $TH2=k2 \cdot Vexit$. Since the controlling depends on a relationship between the entry voltage (denoted Vin) and the exit voltage, the following states may be applied in an exemplary implementation:
Buck region: $Vin(t)>=1.15 \cdot Vexit$
Intermediary region: $0.85 \cdot Vexit<=Vin(t)<=1.15 \cdot Vexit$
Boost region: $Vin(t)<=0.85 \cdot Vexit$ It should however be noted that while in this example the passing from one controlling state to another is executed in very exact thresholds, in other implementations softer decision mechanisms may be implemented. For example, if the entry voltage goes down below the first threshold TH1, but did not yet go below the second threshold TH2, controller 230 may wait a predetermined time before switching to the third control state in case the entry voltage would exceed threshold TH1 once again. It is noted that while controller 230 (or another component of system 200) may actually compute the thresholds TH1 and TH2, in other implementations it may compute other parameters and act accordingly, still reaching the same scheme of switching between control states.

Referring to the shape of the thresholds TH1 and TH2 in the example illustrated in FIGS. 2A and 2B, it is noted that assuming that those thresholds indeed depend linearly on the exit voltage, and that the load 310 is a pulsed load which draws energy from an exit capacitor such as capacitor C2, then the down-slopes of the lines illustrating the thresholds correspond to time periods in which the capacitor discharged due to power consumption by load 310 (possibly while still being charged by power from source 110), and the up-slopes of these lines correspond to time periods in which the capacitor is charged from source 110, but is not drained by load 310 which is in an off-period of its cycle. FIGS. 2A and 2B refer to two different implementations, different at least in the ratio between a frequency of the pulsed source and that of the alternating current provided by source 110. It is also noted that while thresholds TH1 and TH2 are represented in linear segments which may be proportional to linearly changing measured exit voltage, in actual systems the measured exit may change in a non-linear fashion (e.g. in implementations in which it is charged with power originating from a rectified alternating current source).

While in some implementations up-conversion and down-conversion may be carried out concurrently (e.g. when controller 230 is in the third control state), in other implementations controller 230 may prevent such concurrent conversion. According to an embodiment of the invention, controller 230 may be further configured to control deactivation of step-down power converter 210 when controlling the up-conversion by step-up power converter 220 (and vice versa). In other implementations, such deactivation (of either converter 210 or of converter 220) may be carried out when the relationship between the entry voltage and the measured exit voltage qualify to some rules (e.g. pertaining to ratios, thresholds, etc.).

Referring to the boost control state, it is noted that controller 230 may be configured to stop the up-conversion substantially when (and possibly whenever) the entry voltage is in compliance with a cutoff criterion (e.g. when the entry voltage is lower than a cutoff voltage threshold TH(cutoff) that is lower than the second voltage threshold TH2). The cutoff threshold TH(cutoff) may be dynamically determined by controller 230, but this is not necessarily so. In the example of FIGS. 2A and 2B the cutoff threshold TH(cutoff) is fixed.

Reverting to FIG. 1, controller 230 may be implemented in various manners, in different implementations of the invention. For example, controller 230 may be implemented as an independent form using software, hardware and/or firmware—or any combination thereof. Controller 230 may also be implemented by a processing module (implemented in software, hardware, and/or firmware, or any combination thereof, and whether digital, analog, or any combination thereof) which is further capable of implementing other processing functionalities, such as controlling other components. For example, controller 230 may further control the pulsed load or other components of a system into which system 200 is integrated. Controller 230 may be a common control.

The performance of controller 230 may be determined based on the electrical characteristics of the system, and based on requirements which are derived from those characteristics, and optionally based on additional parameters. For example, controller 230 may be operable to receive measurement results of voltages and currents in update rate of hundreds of kilohertz, megahertz, etc., and may be operable to provide control signals to components of the power converters at an update rate of tens to hundreds of kilohertz. Those values are offered as exemplary only, and the invention is not restricted to such values in any way.

Figure 3:
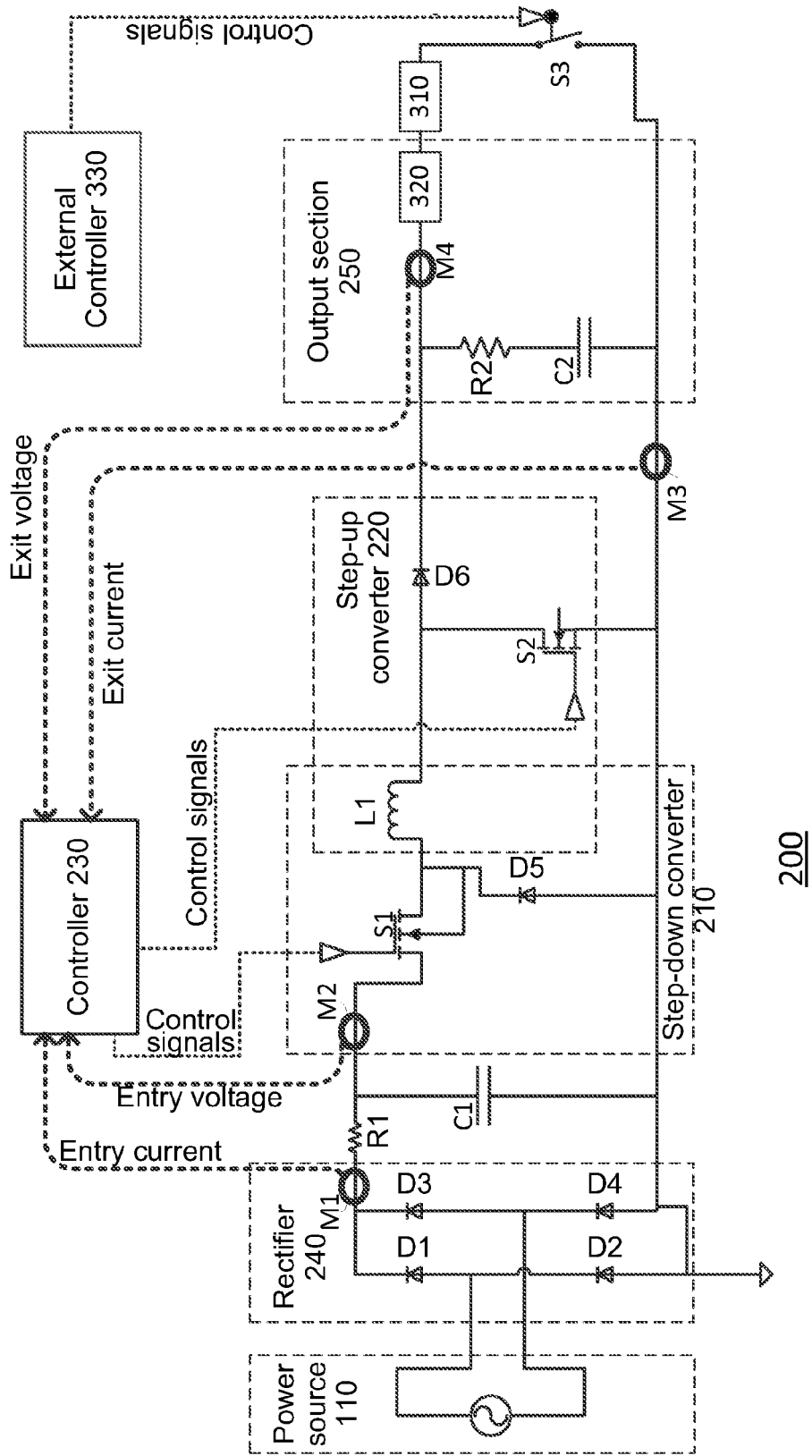
FIG. 3 is a block diagram of a controlled electric power supply system, according to an embodiment of the invention.

FIG. 3 is a block diagram of a controlled electric power supply system 200, according to an embodiment of the invention. Power source 110 in the implementation illustrated in FIG. 3 may be a single phase power source. Rectifier 240, as illustrated in the example of FIG. 3, may be implemented as a full wave rectifier. Additionally, a capacitor C1 (potentially associated with resistance R1) may be implemented as intermediating between source 110 and converters 210 and 220, e.g. in order to moderate any fluctuations or ripples resulting from switching of converter 210 and/or 220. While not necessarily so, the capacitance of capacitor C1 is relatively small, thereby enabling moderation of such fluctuations, but preventing rectification of the current provided by source 110.

As illustrated, step-down converter 210 may be implemented as a circuit that includes inductor L1, diode D5, switch S1, and may also be considered to include one or more components of the output section 250 like capacitor C2, possibly having resistance R2. The flow of current via the step-down converter is governed by switch S1, which is controlled by controller 230 that, as aforementioned, controls, at least in some of the time, down-conversion by step-down power converter 210 of entry voltage from a power source 110. The controlling of the down-conversion may be implemented by controlling the duty cycle of switch S1 (this duty cycle denoted $D_{buck}$), by controlling its switching frequency, and so on. Controlling of the down-conversion by controlling a duty cycle of power converter 210 may be implemented by implementing a pulse width modulation (PWM) control scheme.

As illustrated, step-up converter 220 may be implemented as a circuit that includes inductor L1, diode D6, switch S2, and may also be considered to include one or more components of the output section 250 like capacitor C2, possibly having resistance R2. The flow of current via step-down converter is governed by switch S2, which is controlled by controller 230 that, as aforementioned, controls, at least in some of the time, up-conversion by step-up power converter 210 of entry voltage from a power source 110. The controlling of the down-conversion may be implemented by controlling the duty cycle of switch S1 (this duty cycle denoted $D_{boost}$), by controlling its switching frequency, and so on.

While the step-down and the step-up converters 210 (and possibly also a stand-alone combined converter used for the third control states which involves controlling of at least partly concurrent step-down and step-down-conversion) may be implemented in an entirely independent form (i.e. sharing no common components with the possible exception of simple connection), this is not necessarily so. In other implementations such converters (and especially converters 210 and 220) may share at least one component or at least both utilize at least one component. For example, at least one inductor of system 200 (e.g. inductor L1 illustrated in FIG. 3) may be utilized by the step-down power converter 210 and by the step-down power converter 220 (and possibly also by a combined mode power converter if implemented, not illustrated). It is noted that the aforementioned at least one inductor is an actual inductor, and not just another electrical component (such as a conductor) which has some inductance. For example, the inductor may have inductance which is at least 100 times larger than a straight wire conductor of the same conductance. According to an embodiment of the invention, the at least one inductor is an inductor which has at least 30 coils.

As aforementioned, output section 250, if implemented, may include a capacitor such as capacitor C2, and may include other electrical components as well. Output section 250 may be implemented, for example, in order to moderate any fluctuations resulting from the pulsed consumption of power by pulsed load 310. The consumption of power by pulsed load itself may be governed, in an example, by the same controller 230, e.g. by controlling a state of switch S3.

Figure 4A:
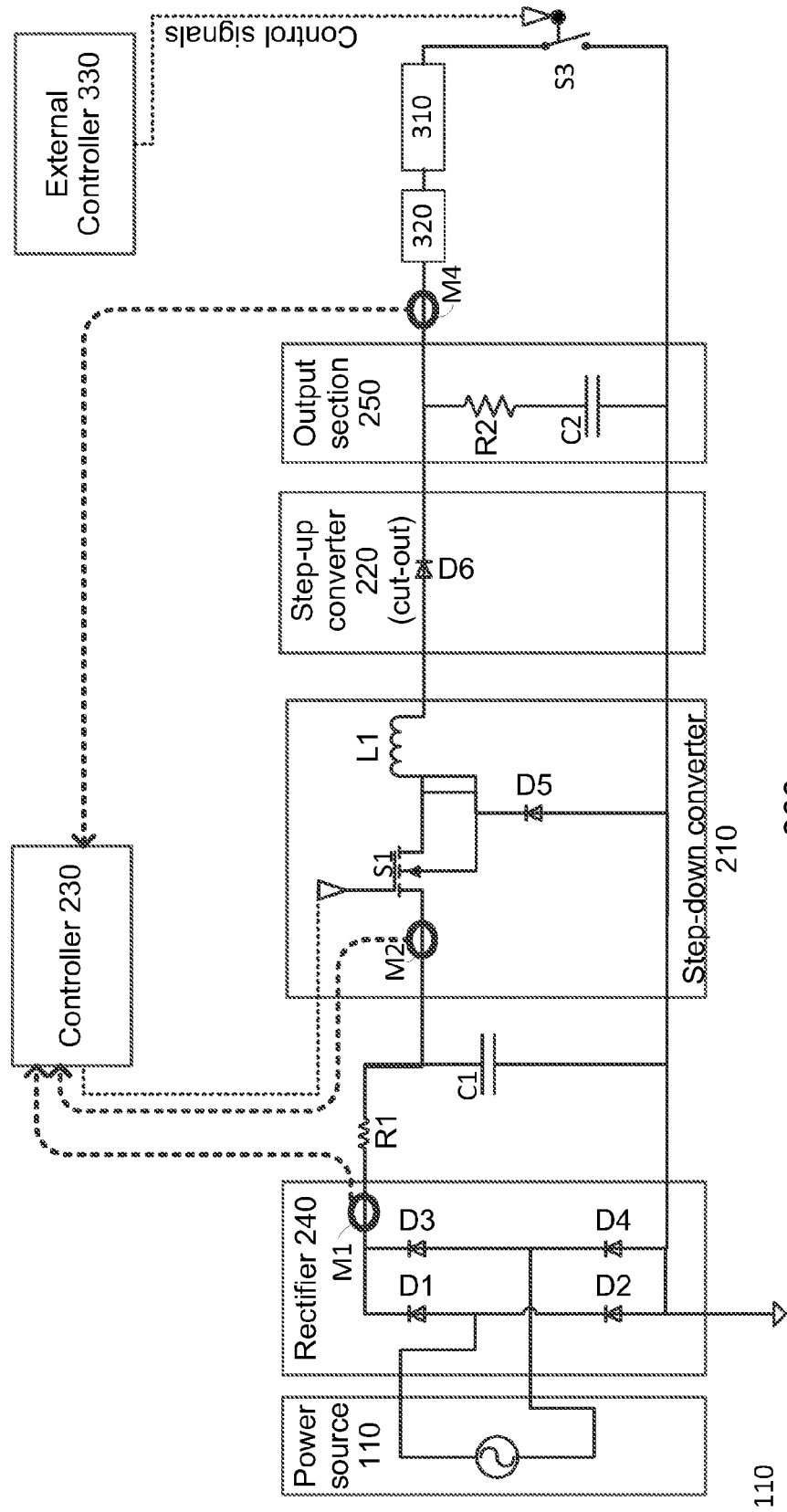
FIG. 4A illustrates an equivalent of the circuit of the system of FIG. 3 when a switch of the boost converter is disconnected.

As noted above, controller 230 controls down-conversion of entry voltage from a source 110 by step-down power converter 210, and in parallel prevents up-conversion by step-up power converter 220 (e.g. in the first control state), when the entry voltage exceeds the first dynamically determined voltage TH1. This may be implemented by alternately activating switch S1 (based on the determined duty cycle $D_{buck}$, and possibly the corresponding switching frequency) while cutting-out (keeping in a constant off-state) switch S2 which otherwise controls step-up converter 220. An equivalent of the circuit of FIG. 3 when switch S2 of the boost converter is disconnected and thus only the buck converter is active for down-converting entry voltage is illustrated in FIG. 4A. Controlling of the up-conversion by controlling a duty cycle of power converter 220 may be implemented by implementing a pulse width modulation (PWM) control scheme.

As also noted above, controller 230 controls up-conversion of the entry voltage by step-up power converter 220 and prevents down-conversion by step-down power converter 210 (e.g. in the second control state), when the entry voltage is in compliance with the second criterion. This conversion state may be implemented by alternately activating switch S2 (based on the determined duty cycle $D_{boost}$, and possibly the corresponding switching frequency) while short-circuiting (keeping in a constant on-state) switch S1 which otherwise controls step-down converter 210. An equivalent of the circuit of FIG. 3 when switch S1 of the boost converter is short-circuited and thus only the boost converter is active for up-converting entry voltage is illustrated in FIG. 4B.

Each of thresholds TH1 and TH2 is dynamically determined (if so implemented) based on a measured exit voltage, which may be measured, for example, in measuring point M4. The entry voltage which is compared to those thresholds (and possibly otherwise checked versus the first and/or second criteria) may be measured, for example, in measuring point M2. It is noted that other electrical values may be measured in measuring points M2 and M4 (or in other measuring points), and such values may also be used for the controlling of converters 210 and/or 220 by controller 230 (e.g. the measuring may include measuring of current, of derivatives of current or voltage over time, and so forth). Other measuring points such as M1 and M3 may also be implemented, and electrical values measured therein may be used by controller 230 for controlling of converters 210 and/or 220. Continuing the same example, current may be measured on M1 and M3 for allowing a loop control of controller 230 to govern converters 210 and 220. This may be useful, for example, when controlling the converters in situations in which the power consumption by load 310 changes. A corresponding meter (for measuring current or voltage, as aforementioned) may be implemented in measuring points M1, M2, M3, and/or M4.

Figure 4B:
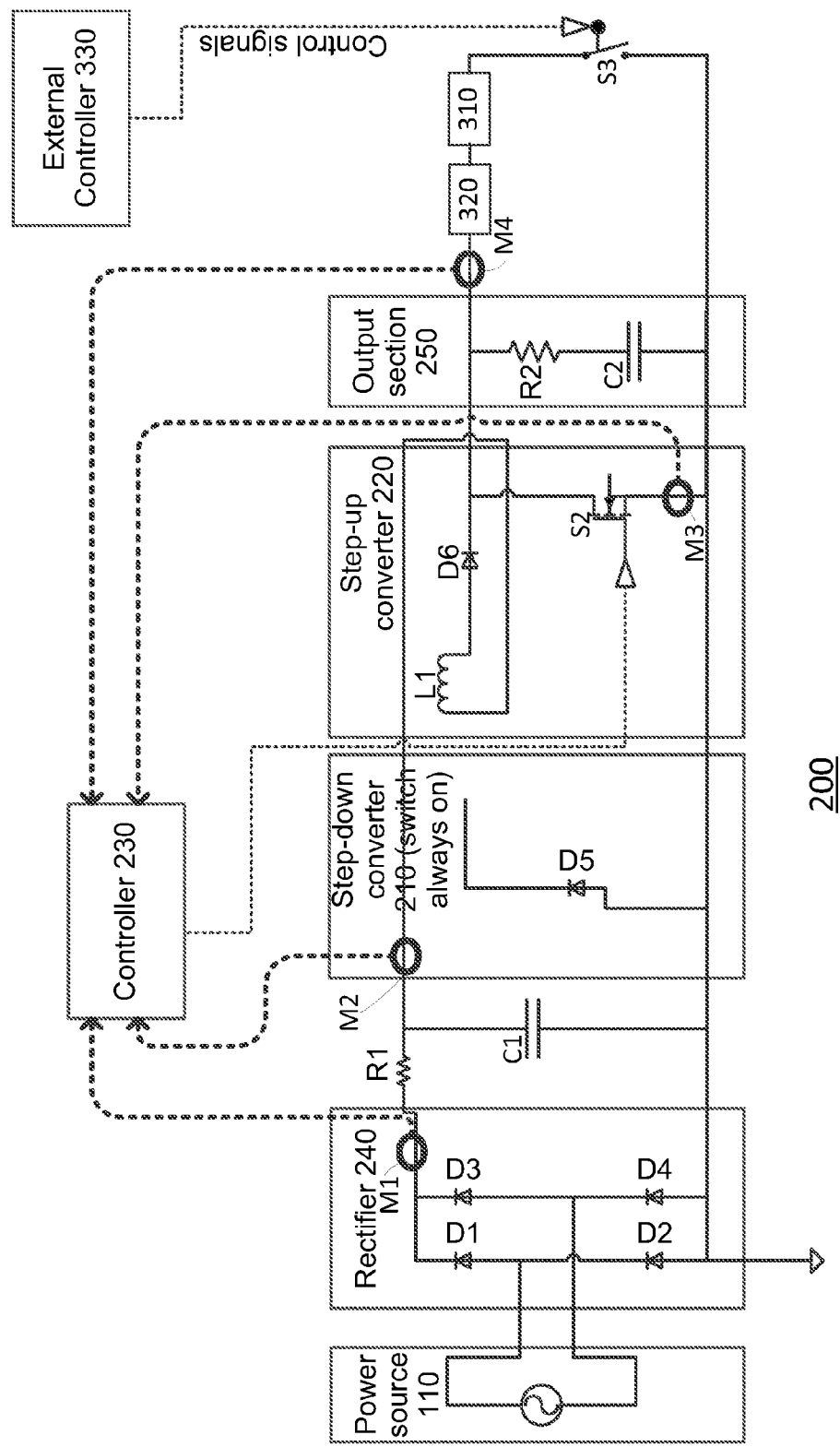
FIG. 4B illustrates an equivalent of the circuit of the system of FIG. 3 when a switch of the boost converter is short-circuited.

FIGS. 4A and 4B illustrate equivalents of the circuit of FIG. 3 in two different operation states: FIG. 4A illustrates an equivalent of the circuit of the system of FIG. 3 when a switch of the boost converter is disconnected; and FIG. 4B illustrates an equivalent of the circuit of the system of FIG. 3 when a switch of the boost converter is short-circuited.

Figure 5:
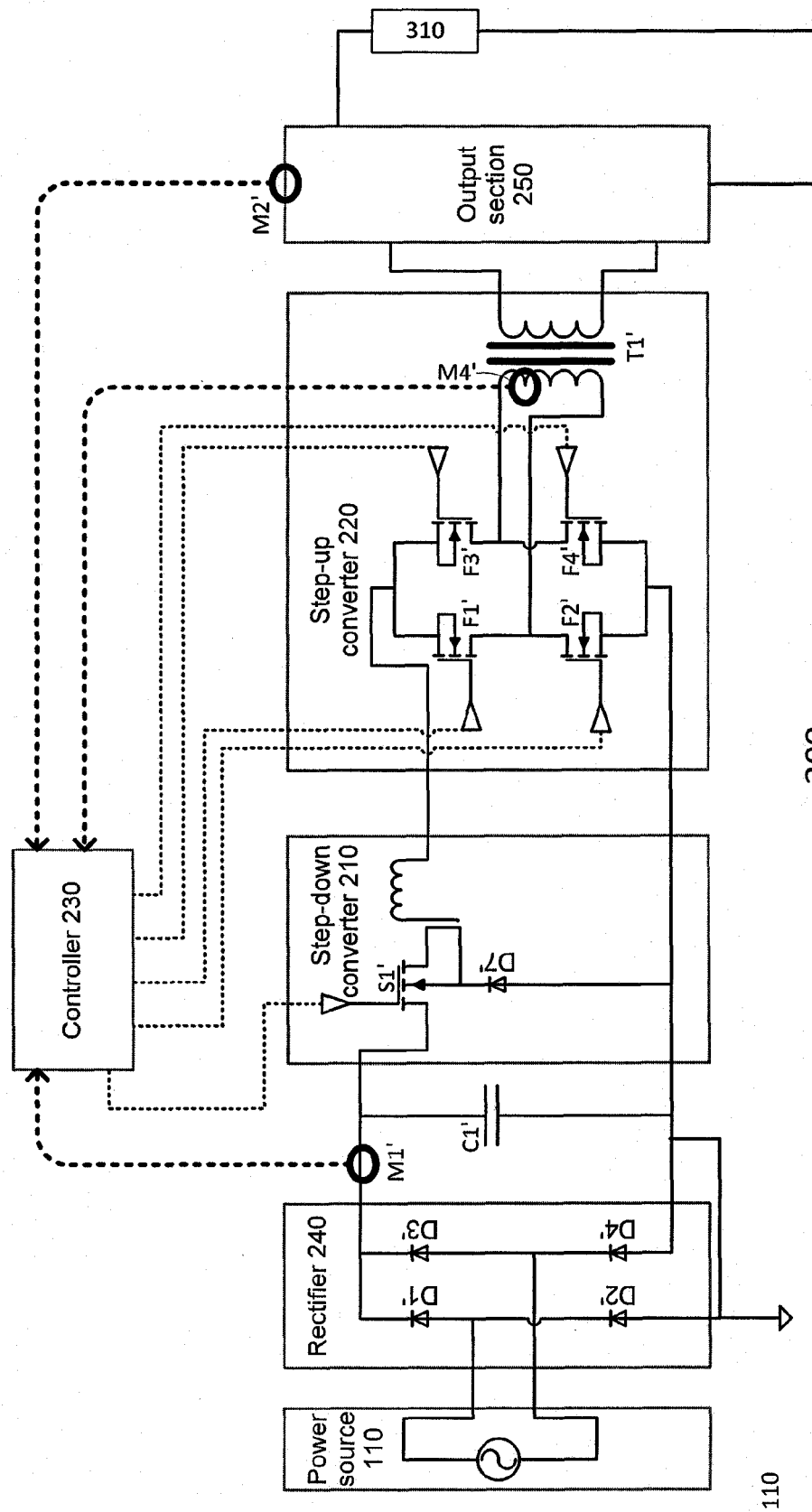
FIG. 5 is a block diagram of a controlled electric power supply system, according to another embodiment of the invention.

FIG. 5 is a block diagram of controlled electric power supply system 200, according to another embodiment of the invention. Power source 110 in the implementation illustrated in FIG. 5 may be a single phase power source. Rectifier 240, as illustrated in the example of FIG. 5, may be implemented as a full wave rectifier. Additionally, a capacitor C1' (potentially associated with resistance R1) may be implemented as intermediating between source 110 and converters 210 and 220, e.g. in order to moderate any fluctuations or ripples resulting from switching of converter 210 and/or 220.

As illustrated, step-down converter 210 may be implemented as a circuit that includes inductor L1', diode D5, switch S1', and may also be considered to include one or more components of output section 250. The flow of current via step-down converter is governed by switch S1', which is controlled by controller 230 that, as aforementioned, controls, at least some of the time, down-conversion by step-down power converter 210 of entry voltage from a power source 110. The controlling of the down-conversion may be implemented by controlling the duty cycle of switch S1' (this duty cycle denoted $D_{buck}$), by controlling its switching frequency, and so on.

A person who is of skill in the art would notice that the implementation exemplified in FIG. 5 does not include a diode equivalent to diode D6 illustrated in FIG. 3. Implementing step-up power converter 220 without such a diode results in reducing electrical losses which may occur on such a diode in other implementations of power converter 220.

As illustrated, step-up converter 220 may be implemented as a circuit that includes multiple (e.g. four) FETs denoted F1' through F4'—each of which is separately controlled by controller 220, transformer T1', and may also be considered to include one or more components of output section 250. The control of the FETs (which may be implemented as MOSFETs) F1' through F4' may be responsive to a duty cycle of the step-up-conversion (this duty cycle denoted $D_{boost}$), by switching each of those FETs in response to this duty cycle, with respect to a corresponding switching frequency. The frequency of switching, the switching scheme, and/or $D_{boost}$ may be determined in response to current (or other electrical values such as voltage) measured on the transformer T1', at measuring point M3'. In the example of FIG. 5, FETs F1' through F4' of step-up converter 220 may be switched to a bridge formation when controller 230 is in the buck control state, and be switched both as a bridge and as a boost converter when controller 230 is in the boost control state. For example, during operation for up-converting by the step-up converter 220 illustrated in FIG. 5, the pairs of FETs F1' and F4' (first pair) and F2' and F3' (second pair) may be switched alternately—wherein only one of the pairs may be switched on at any given time.

Reverting to FIGS. 2A and 2B, the transition between the different conversion control states may occur in conditions which are the equivalents of the crossing of the aforementioned dynamic thresholds which are responsive to the measured exit voltage. In addition, controller 230 may also be configured to dynamically modify the conversion rates of step-down power converter 210 and/or step-up power converter 220. Also, one or both of converters 210 and 220 may be operable to convert in a controllable rate the entry voltage which is varying over time. Such conversion rates may be controlled by controller 230, for example, by selectively modifying the duty cycles $D_{buck}$ and $D_{boost}$ of the respective power converters 210 and 220 (e.g. those may be the duty cycles of corresponding switches S1 and S2, in the example of FIG. 3).

Especially, controller 230 may be configured to (a) dynamically modify down-conversion rate (thus controlling the voltage reduction level) of step-down power converter 210 during an uninterrupted down-conversion of the entry voltage (that is, during down-conversion—e.g. in the buck control state—before an initiation of any up-conversion), and/or (b) dynamically modify up-conversion rate (thus controlling the voltage boost level) of step-up power converter 220 during an uninterrupted up-conversion of the entry voltage (that is, during up-conversion—e.g. in the boost control state—before an initiation of any down-conversion).

For example, in some implementations the duty cycle of each of converters 210 and 220 may determine the ratio between the entry Voltage (Vin) and reflected output Voltage (Vexit, also denoted Vo) at an exit of the respective converter 210 or 220 so that:

For the buck region $V_o = V_{in} * D_{buck}$
For the Boost region $$V_o = \frac{V_{in}}{(1 - D_{boost})}$$

And for the combined Buck/Boost region $$V_o = \frac{V_i * D_{buck}}{(1 - D_{boost})}$$

The conversion rate of one or more of the power converters 210 and 220 may therefore be determined (e.g. by modifying the respective duty cycle) in order to keep a selected ratio between the entry voltage and the reflected output voltage. The conversion rate for each of those regions (buck, boost, and buck/boost) may be determined to assure that none of the operation modes of system 200 (buck, boost, and buck/boost) will exceed predetermined topology constrains Such topology constrains may for example be:

Buck region Vin(t)>=1.15*Vo
Buck-Boost region 0.85*Vo<=Vin(t)<=1.15Vo
Boost region Vin(t)<=0.85*Vo The conversion rate at any point in time may therefore be determined by controller 230 (e.g. by a loop control thereof) so as to conform to the above criteria.

The determination of the conversion rate by controller 230 may nevertheless depend on other factors as well. For example, in situations in which the power level consumed by the load changes suddenly (e.g. in response to an instruction from another controller, etc.), controller 230 may control the conversion rate of at least one of converters 210 and 220 in order to moderate the affects of such a sudden change.

According to an embodiment of the invention in which controller 230 is configured to (a) dynamically modify down-conversion rate of step-down power converter 210 during an uninterrupted down-conversion of the entry voltage and/or (b) dynamically modify up-conversion rate of step-up power converter 220 during an uninterrupted up-conversion of the entry voltage, it may do so based on one or more current measurements.

System 200 may include an entry current meter for measuring the entry voltage (e.g. located at point M1), and/or an exit current meter for measuring an exit current at an exit of both of converters 210 and 220 (e.g. at point M3). It is noted that points M1 and M3 are just exemplary, and other locations for measuring the respective current (entry or exit) may also be implemented. For example, referring to the example of FIG. 3, M1 may be located on either side of resistor R1, or in other locations.

The measurement of entry current in M1 (or elsewhere) may be utilized by controlled 230 for modulating the exit current (measured in M3 or elsewhere) with respect to the entry current, so as to keep the two in phase (thus applying power factor correction—PFC). For example, the average exit current level may be kept to match the average entry current level.

According to an embodiment of the invention, controller 230 is configured to modify the conversion rate of at least one of converters 210 and 220 (e.g. by modifying the duty cycle of the respective converter) in response to the required current. For example, controller 230 may be configured to modify such a conversion rate in response to a result of a comparison of the exit current and the entry current.

According to an embodiment of the invention, controller 230 may be further configured to dynamically modify a conversion rate of the step-up power converter 220 (and/or that of step-down power converter 210), based on a measured entry current and on a measured exit voltage, for applying power factor correction of the system. That conversion rate may be modified (e.g. using PWM) in response to a measured average power consumption of the load, and based on measurements of the entry current (for keeping proper power factor correction).

Figure 6:
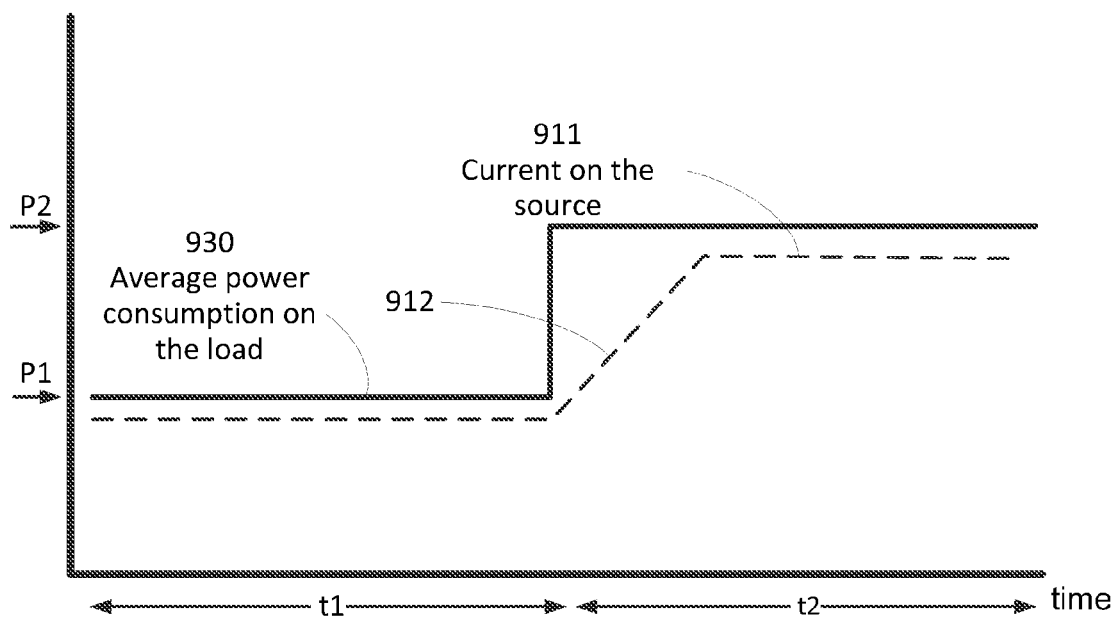
FIG. 6 illustrates the power consumed by a load in two time spans, according to an embodiment of the invention.

FIG. 6 illustrates the average power consumed by load 310 (illustrated by line 930) in two time spans, according to an embodiment of the invention. During a first time span t1 the average power level sourced by load 310 is P1 Watts, while in a second time span t2 the average power level sourced by load 310 is P2 Watts. This may result, from example, from consumption of power by load 310 at a steady maximal level, but with different duty cycle between t1 and t2.

Such an increase in the power consumption level may require an increase in the power level provided by source 110 (which may be an electrical generator). However, increasing the power generation level of source 110 rapidly may result in undesired effects if at all feasible.

Controller 230 may be configured to control duty cycles (or otherwise control the conversion rates) of step-down power converter 210 and step-up power converter 220 for gradually changing the power level sourced from the power source 110 after a sudden change in the power level of load 310. The aforementioned change in the power level of the load 310 is a change in the average power consumption level (averaged over at least several pulses, e.g. over at least 5, 10, or 50 pulses).

Dashed line 911 illustrates the current on source 110 during such a gradual change of power level sourced from source 110. The rate of the gradual change may be determined by controller 230 and may depend on various parameters such as one or more of the following—electrical parameters of source 110, difference between P2 and P1, amount of energy stored in system 200 (e.g. in capacitor C2), definition of the manufacturer of source 110, and so forth.

When gradually changing the level of power sourced from source 110, energy supplied to load 310 may originate from a capacitor (e.g. capacitor C2 of output section 250). Controller 230 may cause converters 210 and 220 to charge storage capacitor C2 at a constant average power, while the requirements of pulsed load 310 will be served by the energy stored in capacitor C2, so that source 110 will provide the energy consumed by load 310 at a substantially constant rate.

It is noted that the gradual change of the level of power sourced from source 110 may be designed to assure the limits of the capabilities of source 110 will not be exceeded while the system is serving heavy duty cycles load.

In the long run Es, the energy supplied by source 110 (e.g. Es=½rms*Irms), and Ec, the energy supplied by capacitor C2 (e.g. Ec=½C*(VC2-initial$^2$-VC2-final$^2$)), are equal (ES=EC), so that the voltage of capacitor C2 may be kept within predetermined limits. It is assumed that the energy level provided by source 110 may change with time with respect to demand (it is noted that load 310 may not be the only load sourcing from source 110), and especially, in some implementations it may be controllable—e.g. by controller 230. However, such a modification of power generation levels (whether an increase or a decrease thereof) takes time, and may take longer than the change in the energy requirements levels of load 310.

In implementations in which such gradual change is implemented and also in implementations in which it is not, system 200 may be used to ensure that power is sourced from source 110 in an almost constant current, even though the one or more loads 310 connected thereto may consume power in an irregular fashion. The level in which the current which is sourced from source 110 is constant may depend on various factors, and may depend on the complexity and electrical complexity of the various components of system 200, and especially of controller 230 and of the one or more switches controlling converters 210 and 220.

By way of example only, sourcing power from source 110 in a substantially constant current whose variations in time are less than 10% may be achieved while serving a pulsed load 310 having a varying duty cycle. The desired accuracy level may be determined (e.g. due to design requirements), and consequentially the computational complexity may be determined Higher required accuracy level of the current sourced from source 110 may affect the response time of system 200 (e.g. when the power requirements of load 310 change).

It should be noted that the same isolation of direct influence of changes in power consumption by load 310 on source 110 also helps to mitigate effects of inrush current by pulsed load 310. Especially, when the switch which controls step-up converter 220 (e.g. switch S2) is disconnected, in-rush effects are prevented. The switch may be controllably opened to achieve the permitted slope 912.

Reverting to FIG. 1A, it should be noted that controller 230 may be configured to control the conversion by converters 210 and 220 for further achieving power factor correction (PFC), which is implemented by draining from power source 110 current in phase to the line voltage thereof. The current drained may be a substantially sinusoidal current, otherwise shaped (e.g. DC current, trapezoid wave current, etc.). If the voltage of AC source 110 is not sinusoidal over time (e.g. in systems having a distortion such as, for example, interferences from other equipment), current corresponding to such voltage may nevertheless be sourced from source 110.

Figure 7:
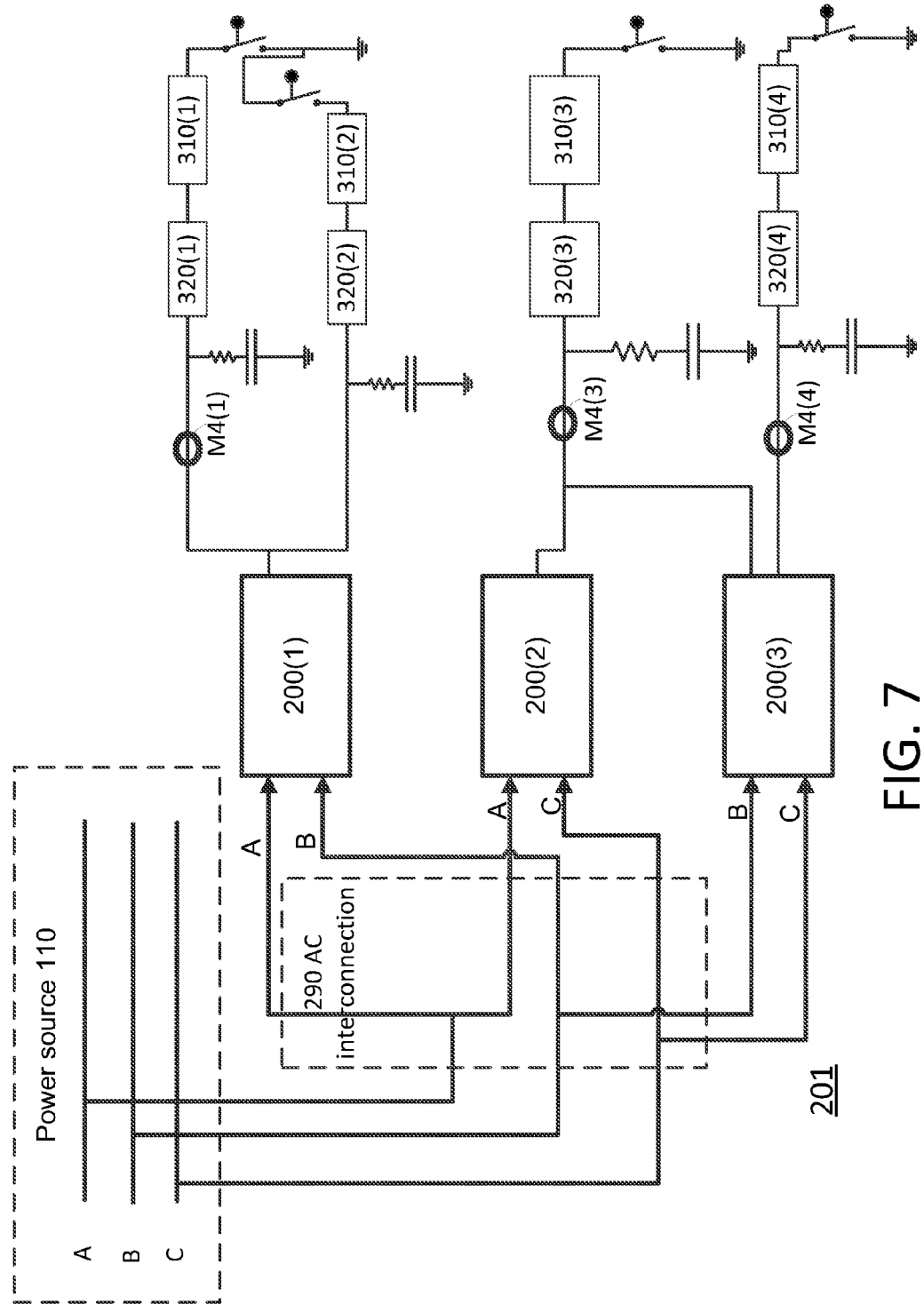
FIG. 7 illustrates a controlled electric power supply system, according to an embodiment of the invention.

FIG. 7 illustrates controlled electric power supply system 201, according to an embodiment of the invention. As illustrated in FIG. 7, according to an embodiment of the invention power source 110 may be a three phase power source. The three phases are denoted A, B, and C.

Utilization of a three phases system may be achieved by implementing three systems 200 (also referred to as "Switching Mode Current Sources"). Those implementations of system 200 (denoted 200(1) through 200(3) in FIG. 7) may be entirely isolated from each other (e.g. as exemplified in FIG. 7), but this is not necessarily so, and those systems 200 may share some component and/or be electrically influenced by one another. Especially, according to an embodiment of the invention, a single controller may control the conversion by converters 210 and/or 220 or two or more of the multiple systems 200 connected to the power source 110.

In each of the systems 200 of FIG. 7, the power source 110 supplying power thereto is a three phase power source, wherein the step-up and the step-down power converters of that system 200 are connected to the same two phases of this power source.

Referring to systems 200 in general, and especially to systems 200(1) through 200(3), it is noted that each system 200 may possibly serve more than a single pulsed load 310. For example, system 200(1) illustrated in FIG. 7 serves two loads—load 310(1) and load 310(2). Such different loads 310 served by a single system 200 may pulse in synchronization, but this is not necessarily so. According to an embodiment of the invention, a single load 310 may even be served by more than one system 200 (e.g. system 200(1) and system 200(2)). It should be noted that when multiple loads 310 are connected to a single system 200, two systems 200 that are connected in an electronically equivalent manner to source 110 (e.g. to the same pair of phases thereof) may be implemented, e.g. if the number of loads 310 exceeds the number of loads that may be served by a single such system 200.

When serving more than one load 310 by a single system 200, the measurement of the exit voltage and/or the exit current may be done before the splitting of the power supply to the different loads (as illustrated in FIG. 7). In another alternative, measurement of different exit current and/or exit voltage may be executed for different loads served, and controller 230 would in such a case utilize such multiple measurements (e.g. by summing them) where a single measured exit voltage (or current) was discussed above.

Furthermore, a single load 310 may be served by more than one system 200. For example, load 320(3) illustrated in FIG. 7 is served by two systems 200—system 200(2) and system 200(3).

Each of systems 200(1) through 200(3) is connected to a different pair of phases (in the example of FIG. 7 system 200(1) is connected to phases [A and B], system 200(2) is connected to phases [A and C], and system 200(3) is connected to phases [B and C]), possibly via an AC interconnection 290 which may also electrically isolate them one from the other.

Utilization of multiple systems 200 with a three phase source allows the complete system 201 to operate a draining current (from source 110) of the same shape and in phase with the applied source voltage.

Referring to controlled electric power supply system 201, apart from the step-down power converter 210 and step-up power converter 220 of system 200(1), it further includes a second step-down power converter and a second step-up power converter (both of which belong to system 200(2) and are connected to a second pair of phases, e.g. phases A and C), a third step-down power converter and a third step-up power converter (both of which belong to system 200(3) and are connected to a third pair of phases, e.g. phases B and C). The converters of system 200(1) may be connected to a first pair of phases, such as phases A and B. As aforementioned, system 200(2) and 200(3) may utilize the same controller 230 as system 200(1), but this is not necessarily so, and more than one controller may be used (e.g. an independent controller for each of systems 200(1) through 200(3)).

Generally, at least one controller of system 201 (which may be the controller 230 controlling system 200(2)) is connected to the second step-down power converter and to the second step-up power converter, which is configured to: (a) control down-conversion by the second step-down power converter of second entry voltage from the power source and prevent up-conversion by the second step-up power converter, substantially when the second entry voltage is larger than a second measured exit voltage and is in compliance with a third criterion that is based on the second entry voltage and on the second measured exit voltage; wherein the second measured exit voltage is measured at an exit of both second step-up power converter and the second step-down power converter; and (b) control up-conversion by the second step-up power converter of the second entry voltage and prevent down-conversion by the second step-down power converter, substantially when the second entry voltage is lower than the second measured exit voltage and is in compliance with a fourth criterion that is based on the second entry voltage and on the second measured exit voltage;

Likewise, at least one controller of system 201 (which may be the controller 230 controlling system 200(3)) is connected to the third step-down power converter and to the third step-up power converter, which is configured to: (c) control down-conversion by the third step-down power converter of third entry voltage from the power source and prevent up-conversion by the third step-up power converter, substantially when the third entry voltage is larger than a third measured exit voltage and is in compliance with a fifth criterion that is based on the third entry voltage and on the second measured exit voltage; wherein the third measured exit voltage is measured at an exit of both third step-up power converter and the third step-down power converter; and (d) control up-conversion by the third step-up power converter of the third entry voltage and prevent down-conversion by the third step-down power converter, substantially when the third entry voltage is lower than the third measured exit voltage and is in compliance with a sixth criterion that is based on the third entry voltage and on the third measured exit voltage.

While not necessarily so, the first, second, and third measured exit voltages are measured independently from one another. For example, while the first measured exit voltage may be the exit voltage of system 200(1) (e.g. measured over capacitor C2 thereof), the second measured exit voltage may be the exit voltage of system 200(2) (e.g. measured over capacitor C2 thereof), and the third measured exit voltage may be the exit voltage of system 200(3) (e.g. measured over capacitor C2 thereof).

FIG. 8 illustrates method 500 for controlling electric power supply, according to an embodiment of the invention. Referring to the examples set forth with respect to the previous drawings, method 500 may be carried out by a system such as system 200. Furthermore, it is noted that disclosed embodiments of system 200 have counterpart implementations of method 500, even when not explicitly elaborated, and vice versa.

Method 500 includes stage 510 of controllably down converting by a step-down power converter entry voltage from a power source and preventing up-conversion by a step-up power converter, substantially when (possibly whenever) the entry voltage is larger than a measured exit voltage and is in compliance with a first criterion that is based on the entry voltage and on the measured exit voltage; wherein the measured exit voltage is measured at an exit of both step-up power converter and the step-down power converter. Referring to the examples set forth with respect to the previous drawings, the down-converting of stage 510 may be carried out by a step-down power converter such as step-down power converter 210 of system 200. A controlling of such down-converting may be carried out by a controller such as controller 230.

For example, stage 510 may include controllably down converting by a step-down power converter entry voltage from a power source and preventing up-conversion by a step-up power converter, substantially when the entry voltage exceeds a first dynamic voltage threshold that is based on a measured exit voltage and is larger than the measured exit voltage.

Method 500 further includes stage 520 of controllably up converting by the step-up power converter the entry voltage and preventing down-conversion by the step-down power converter, substantially when (possibly whenever) the entry voltage is lower than the measured exit voltage and is in compliance with a second criterion that is based on the entry voltage and on the measured exit voltage.

For example, stage 520 may include controllably up converting by the step-up power converter the entry voltage and preventing down-conversion by the step-down power converter, substantially when the entry voltage is lower than a second dynamic voltage threshold that is based on the measured exit voltage and is lower than the measured exit voltage. Referring to the examples set forth with respect to the previous drawings, the up-converting of stage 510 may be carried out by a step-up power converter such as step-up power converter 220 of system 200. A controlling of such up-converting may be carried out by a controller such as controller 230.

If the first and/or the second dynamic voltage thresholds are utilized as a basis for comparison with the entry voltage, method 500 may include dynamically determining the first and/or the second voltage thresholds based on the measured exit voltage.

Stages 510 and 520 are carried out interchangeably (but not concurrently) depending on a relationship between the measured exit voltage and the entry voltage at different times. It is noted that sometimes during an operation of the system that includes the step-down and the step-up converters of stages 510 and 520, neither step 510 nor step 520 is necessarily carried out. Some examples are provided in FIG. 9.

Figure 9:
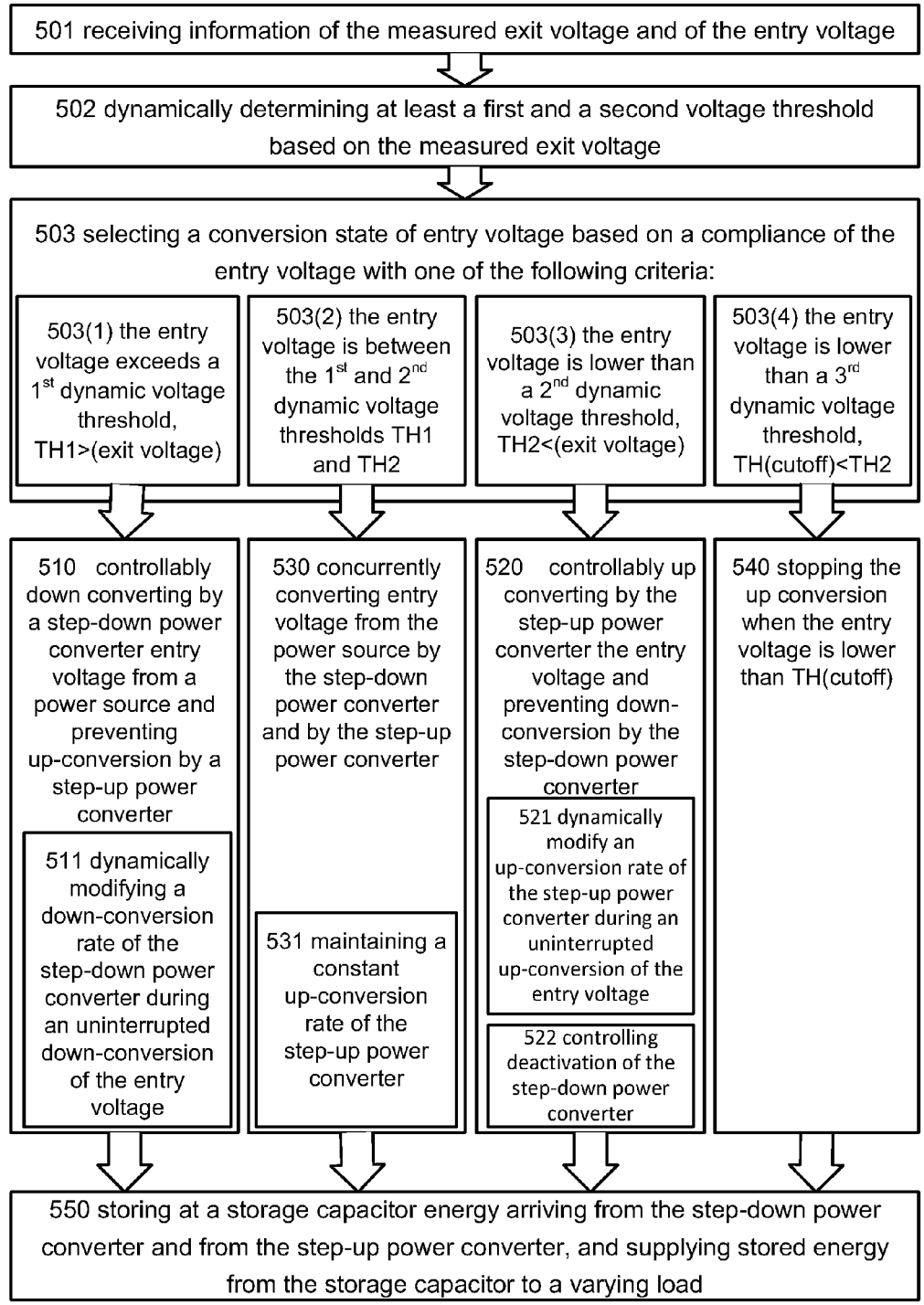
FIG. 9 illustrates a method for controlling electric power supply, according to an embodiment of the invention.

FIG. 9 is another illustration of method 500, according to an embodiment of the invention. Method 500 may include stage 501 of receiving information of the measured exit voltage and of the entry voltage. It should be noted that method 500 may include (alternatively or in addition) measuring at least one of the entry voltage and the exit voltage. Stage 501 may be repeated from time to time, e.g. at intervals of a few microseconds. It is noted that the entry voltage and the exit voltage are not necessarily determined concurrently or at the same frequency.

Method 500 may optionally include stage 502 of dynamically determining at least first and a second voltage thresholds TH1 and TH2, based on the measured exit voltage. The thresholds may be determined in different ways in different embodiments of the invention. However, first voltage threshold TH1 is larger than the measured exit voltage while the second voltage threshold TH2 is lower that the measured exit voltage. Referring to the examples set forth with respect to the previous drawings, stage 502 may be carried out by a controller such as controller 230.

In various possible implementations, each one of the thresholds may linearly depend on the measured exit voltage (denoted Vexit), such as $TH1=k1 \cdot Vexit+a1$, may depend on a power of the exit voltage (e.g. $TH1=k1 \cdot (Vexit^{P1})+a1$), on an exponent of it (e.g. $TH1=k1 \cdot e^{Vexit}+a1$), and so forth. It is noted that these two thresholds may be determined by different equations (and not only by different parameters), as long as TH1>TH2 for all possible Vo.

In a possible implementation, threshold TH1 may be determined as $TH1=k1 \cdot Vexit$ and $TH2=k2 \cdot Vexit$. Since the controlling depends on a relationship between the entry voltage (denoted Vin) and the exit voltage, the following states may be applied in an exemplary implementation:

Stage 502, if implemented, is also repeated from time to time. For example, the thresholds may be determined each time the exit voltage is measured, but this is not necessarily so.

It should be noted that stage 502 may also include determining a value of a cutoff voltage threshold TH(cutoff), which is lower than threshold TH2.

However, threshold TH(cutoff)—if at all implemented—may alternatively be predeterminely fixed (or at least determined at a significantly lower rate than the determining of thresholds TH1 and TH2).

Method 500 may also include stage 503 of selecting a conversion state of entry voltage based on a compliance (or incompliance) of the entry voltage with a criterion selected from a group of criteria that includes the first and the second criteria, and possibly other criteria as well. For example, stage 503 may include selecting the conversion stage of entry voltage based on a comparison of the entry voltage to at least one of the dynamically determined voltage thresholds TH1, TH2, and possibly also TH(cutoff).

Stage 503 may also include (alternatively or in addition) selecting a control state for the controller which controls the step-up and step-down power converters of stages 510 and 520, based on compliance with at least one of the following criteria—the first criterion, the second criterion, the parallel-conversion criterion, and/or a cutoff criterion (e.g. based on a comparison of the entry voltage to at least one of the dynamically determined voltage thresholds TH1, TH2, and possibly also TH(cutoff), or on a process equivalent to such a comparison). Referring to the examples set forth with respect to the previous drawings, stage 503 may be carried out by a controller such as controller 230.

It should be noted that execution of each of stages 510, 520, 530, and/or 540 may be carried out whenever the entry voltage is in compliance with a corresponding criterion (e.g. 503(1), 503(2), 503(3), and/or 503(4) respectively) is fulfilled. However, in other implementations some restriction to those causality relationships may be applied, hence each of one or more of the stages 510, 520, 530, and/or 540 may be executed substantially when the entry voltage is in compliance with the corresponding criterion. Few examples for such reservations have been offered above.

Different results of compliance with such various criteria (exemplified using the aforementioned dynamic voltage thresholds) are illustrated in FIG. 9 in 503(1) through 503(4). It should be noted that compliance with the exemplified criteria may be a result of an explicit comparison of the entry voltage with one or more of those thresholds (TH1, TH2, and/or TH(cutoff)), but this is not necessarily so. In the illustrated example:

a. in result 503(1) the entry voltage exceeds the first dynamically determined voltage threshold, TH1>(exit voltage);

b. in result 503(2) the entry voltage is between the first and the second dynamically determined voltage thresholds TH1 and TH2;

c. in result 503(3) the entry voltage is lower than the third dynamically determined voltage threshold, TH2<(exit voltage); and d. in result 503(4) the entry voltage is lower than the dynamically determined cutoff voltage threshold, TH(cutoff)<TH2.

It should be noted that result 503(4) is in fact a private case of result 503(3). Furthermore, the comparison with threshold TH(cutoff) is not necessarily implemented. Also, comparison with other thresholds, possibly softly-defined ones may also be implemented. It will be clear to a person who is of skill in the art that the illustrated flow chart examples are exemplary in nature, and that other implementations include different decision rules. If result 503(4) is not searched for (no comparison with TH(cutoff)), the consequence may be the same as in result 503(3).

If 503(2) is not implemented (or if it implemented for a narrower range of voltages, narrower than TH1>$V_{entry}$>TH2), then in at least part of the range stage 510 or stage 520 may be implemented.

Referring to the aforementioned stage 510, it is noted that it may follow result 503(1). That is, stage 510 may be executed substantially when the result of stage 503 is result 503(1) (and possibly whenever this occurs). Method 500 may include stage 511 of dynamically modifying a down-conversion rate of the step-down power converter during an uninterrupted down-conversion of the entry voltage. Referring to the examples set forth with respect to the previous drawings, stage 511 may be carried out by a controller such as controller 230. It should be noted that stage 511 may also be carried out, in some implementations, not only concurrently with an execution of stage 510 but also with an execution of stage 530.

Referring to the aforementioned stage 520, it is noted that it may follow result 503(3). That is, stage 520 may be executed substantially when the result of stage 503 is result 503(3) (and possibly whenever this occurs). Method 500 may include stage 521 of dynamically modifying an up-conversion rate of the step-up power converter during an uninterrupted up-conversion of the entry voltage. Referring to the examples set forth with respect to the previous drawings, stage 521 may be carried out by a controller such as controller 230. It should be noted that stage 521 may also be carried out, in some implementations, not only concurrently with an execution of stage 520 but also with an execution of stage 530.

Optional stage 522 of method 500 may be carried out concurrently with at least a part of stage 520, and it includes controlling deactivation of the step-down power converter during the controllable up-conversion. Referring to the examples set forth with respect to the previous drawings, stage 522 may be carried out by a controller such as controller 230.

Method 500 may include stage 530 (which may follow from result 503(2)), that includes controllably concurrently converting entry voltage from the power source by the step-down power converter and by the step-up power converter, when the entry voltage is higher than the second dynamically determined voltage threshold TH2 and is lower than the first dynamically determined voltage threshold TH1. Stage 530 may be executed substantially when the result of stage 503 is result 503(2) (and possibly whenever this occurs).

Referring to the examples set forth with respect to the previous drawings, the down-converting of stage 530 may be carried out by a step-down power converter such as step-down power converter 210 of system 200, while the up-converting of stage 530 may be carried out by a step-up power converter such as step-up power converter 220 of system 200. Alternatively, another converter, also referred to as buck-boost power converter, may be implemented. The controlling of stage 530 may be carried out by a controller such as controller 230.

Alternatively, method 500 may include controllably concurrently up-converting and down-converting, by a step-up/down power converter, the entry voltage.

While not necessarily so, stage 530 may include stage 531 of maintaining a constant up-conversion rate of the step-up power converter during some or all of the controllable concurrent conversion.

Optional stage 540 of method 500, which may follow result 503(4), includes stopping the up-conversion when the entry voltage is lower than TH(cutoff). Stage 540 may be executed substantially when the result of stage 503 is result 503(4) (and possibly whenever this occurs).

According to an embodiment of the invention, method 500 may include controllably concurrently converting entry voltage from the power source by the step-down power converter and by the step-up power converter, substantially when the entry voltage is in compliance with a cutoff criterion that is based on the entry voltage and on the measured exit voltage, and is not in compliance with the first and the second criteria.

As mentioned in relation to system 200, in some instances the power consumption of the load which consumes the power from the step-down and the step-up converters may change, and method 500 may include steps executed for mitigating the effects of such a change. For example, method 500 may include controlling duty cycles of the step-down power converter and of the step-up power converter for gradually changing the power level sourced from the power source after a sudden change in the load power level. Such controlling may be executed concurrently with any one or more of stages 510, 520, 530 and 540.

The power which results from the conversion by the step-up power converter and from the step-down power converter may be consumed by one or more loads. Referring to the examples set forth with respect to the previous drawings, such a load may be load 310. For example, method 500 may include stage 550 of storing at a storage capacitor energy arriving from the step-down power converter and from the step-up power converter, and supplying stored energy from the storage capacitor to a varying load. In such an implementation, the exit voltage may be measured across the storage capacitor. Referring to the examples set forth with respect to the previous drawings, such a capacitor may be capacitor C2.

As mentioned in relation to system 200, various types of power sources (and especially of AC power sources) may be implemented. For example, the power source may be a single-phase or a three phase power source. By way of example, in the latter case the controllable up-conversion and the controllable down-conversion (of stages 510, 520, and possibly also of stage 530) may include converting power received from a first pair of phases of the power source which is a three phase power source.

According to such an embodiment of the invention (in which the power source is a three-phase power source), method 500 may include the following stages:

controllably down converting by a second step-down power converter second entry voltage from the power source and preventing up-conversion by a second step-up power converter, substantially when the second entry voltage is larger than a second measured exit voltage and is in compliance with a third criterion that is based on the second entry voltage and on the second measured exit voltage; wherein the second measured exit voltage is measured at an exit of both second step-up power converter and the second step-down power converter;

controllably up converting by the second step-up power converter the second entry voltage and preventing down-conversion by the second step-down power converter, substantially when the second entry voltage is lower than the second measured exit voltage and is in compliance with a fourth criterion that is based on the second entry voltage and on the second measured exit voltage;

controllably down converting by a third step-down power converter third entry voltage from the power source and preventing up-conversion by a third step-up power converter, substantially when the third entry voltage is larger than a third measured exit voltage and is in compliance with a fifth criterion that is based on the third entry voltage and on the second measured exit voltage; wherein the third measured exit voltage is measured at an exit of both third step-up power converter and the third step-down power converter; and controllably up converting by the third step-up power converter the third entry voltage and preventing down-conversion by the third step-down power converter, substantially when the third entry voltage is lower than the third measured exit voltage and is in compliance with a sixth criterion that is based on the third entry voltage and on the third measured exit voltage;

wherein the second step-down power converter and the second and step-up power converter are connected to a second pair of phases of the power source that is different from the first pair; wherein the third step-down power converter and the third and step-up power converter are connected to a third pair of phases of the power source that is different from the first pair and from the second pair.

In the above description it is assumed that the second step-down power converter and the second and step-up power converter are connected to a second pair of phases of the power source that is different from the first pair; and that the third step-down power converter and the third and step-up power converter are connected to a third pair of phases of the power source that is different from the first pair and from the second pair.

Figure 10A:
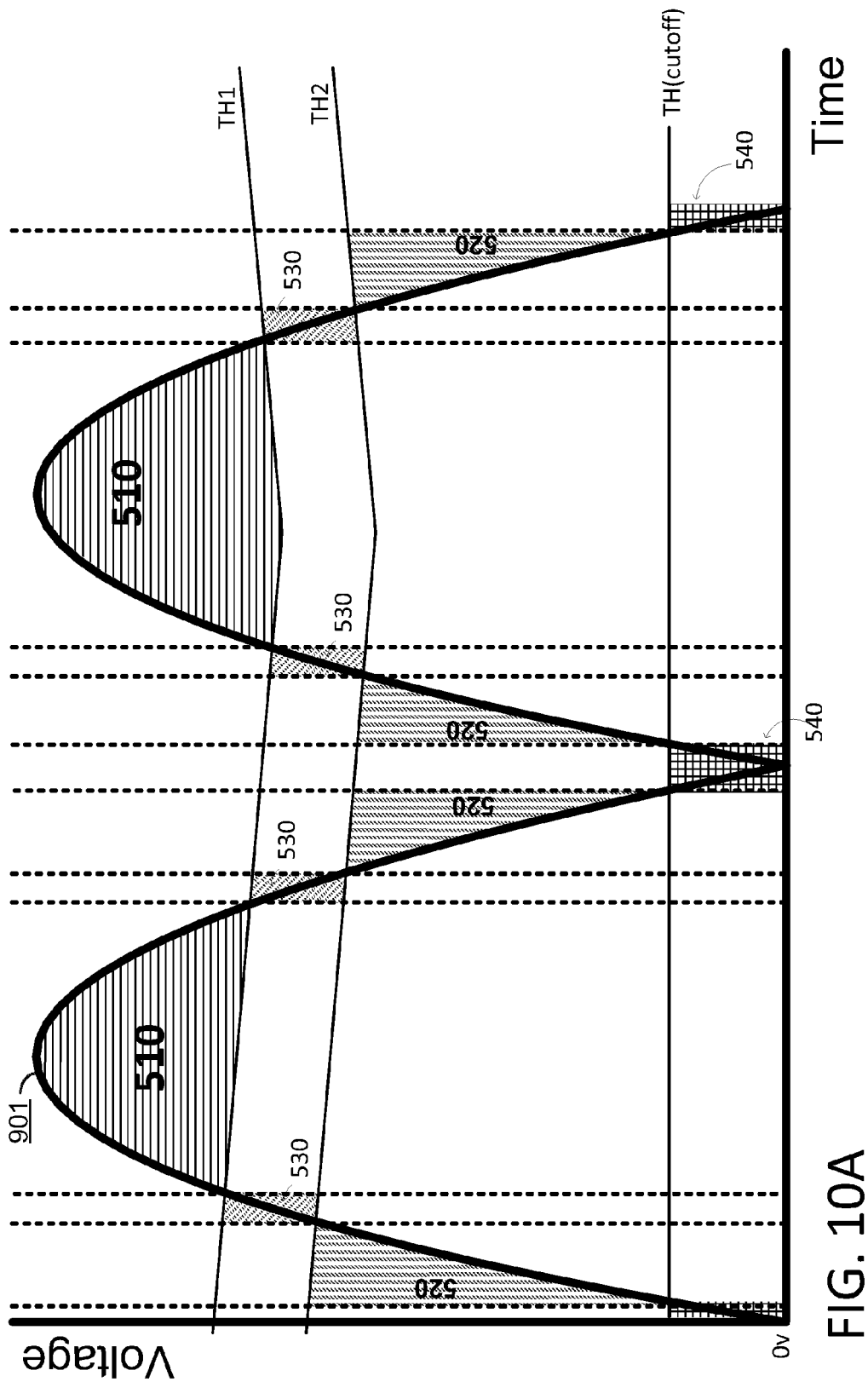
FIGS. 10A and 10B illustrate the execution of different stages of the method of FIG. 9, according to an embodiment of the invention, when viewed on a graph showing the relationship between entry voltage and thresholds as a function of time.
Figure 10B:
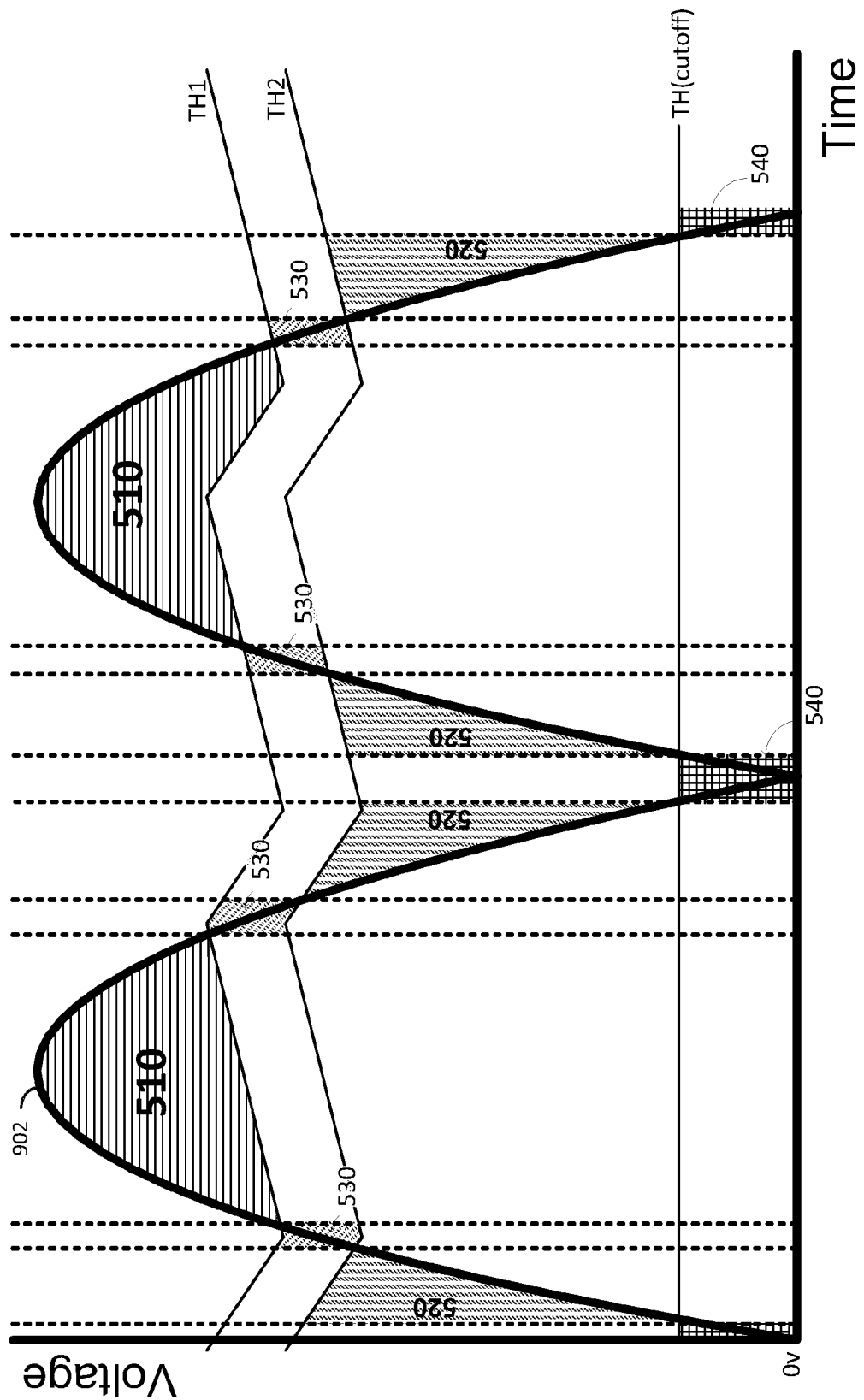

FIGS. 10A and 10B illustrate the execution of different stages of method 500 (stages 510, 520, 530, and 540), according to an embodiment of the invention, when viewed on a graph showing the relationship between the entry voltage (denoted 902) as a function of time, and the dynamic thresholds TH1, TH2, and TH(cutoff). The implementations of FIGS. 10A and 10B differ at least in the frequency of the load with respect to that of the power source.

A program storage device that is readable by machine is also disclosed. The program storage device tangibly embodies a program of instructions executable by the machine to perform method for controlling electric power supply, the method comprising the steps of: (a) controllably down converting by a step-down power converter entry voltage from a power source and preventing up-conversion by a step-up power converter, substantially when the entry voltage is larger than a measured exit voltage and is in compliance with a first criterion that is based on the entry voltage and on the measured exit voltage; wherein the measured exit voltage is measured at an exit of both step-up power converter and the step-down power converter; and (b) controllably up converting by the step-up power converter the entry voltage and preventing down-conversion by the step-down power converter, substantially when the entry voltage is lower than the measured exit voltage and is in compliance with a second criterion that is based on the entry voltage and on the measured exit voltage.

Referring to the examples set forth with respect to the previous drawings, the program of instructions that is executable by machine may be executable to perform method 500. Furthermore, it is noted that disclosed embodiments of method 500 have counterpart implementations of the program of instructions, even when not explicitly elaborated.

Optionally, the instructions may further include instructions for controlling concurrent conversion of entry voltage from the power source by the step-down power converter and by the step-up power converter, substantially when the entry voltage is in compliance with a cutoff criterion that is based on the entry voltage and on the measured exit voltage, and is not in compliance with the first and the second criteria.

Optionally, the instructions may further include instructions for maintaining a constant up-conversion rate of the step-up power converter during the controllable concurrent conversion.

Optionally, the instructions may further include instructions for dynamically modifying a down-conversion rate of the step-down power converter during an uninterrupted down-conversion of the entry voltage.

Optionally, the instructions may further include instructions for dynamically modifying an up-conversion rate of the step-up power converter during an uninterrupted up-conversion of the entry voltage.

Optionally, the instructions may further include instructions for dynamically modifying a conversion rate of at least one of the step-up power converter and the step-down power converter, based on a measured entry current and on a measured exit voltage, for applying power factor correction of the system.

Optionally, the instructions may further include instructions for controlling duty cycles of the step-down power converter and of the step-up power converter for gradually changing the power level sourced from the power source after a sudden change in the load power level.

It will be appreciated that the embodiments described above are cited by way of example, and various features thereof and combinations of these features can be varied and modified.

While various embodiments have been shown and described, it will be understood that there is no intent to limit the invention by such disclosure, but rather, it is intended to cover all modifications and alternate constructions falling within the scope of the invention, as defined in the appended claims.

What is claimed is:

1. A controlled electric power supply system, the system comprising:
   a step-down power converter;
   a step-up power converter; and
   a controller, coupled to the step-down power converter and to the step-up power converter, configured to:
   control down-conversion by the step-down power converter of entry voltage from a power source and prevent up-conversion by the step-up power converter, substantially when the entry voltage is larger than a measured exit voltage and is in compliance with a first criterion that is based on the entry voltage and on the measured exit voltage; wherein the measured exit voltage is measured at an exit of both step-up power converter and the step-down power converter; and control up-conversion by the step-up power converter of the entry voltage and prevent down-conversion by the step-down power converter, substantially when the entry voltage is lower than the measured exit voltage and is in compliance with a second criterion that is based on the entry voltage and on the measured exit voltage, wherein the controller is configured to determine that the entry voltage is in compliance with said first criterion substantially when the entry voltage exceeds a first voltage threshold that is based on the measured exit voltage and is higher than the measured exit voltage, and to determine that the entry voltage is in compliance with said second criterion substantially when the entry voltage is lower than a second voltage threshold that is based on the measured exit voltage and is lower than the measured exit voltage.

2. The system according to claim 1, further comprising a storage capacitor for storing energy arriving from the step-down power converter and from the step-up power converter, and for supplying stored energy to a varying load; wherein the exit voltage is measured across the storage capacitor.

3. The system according to claim 1, wherein at least one inductor of the system is utilized by the step-up power converter and by the step-down power converter.

4. The system according to claim 1, wherein the controller is further configured to control concurrent conversion of entry voltage from the power source by the step-down power converter and by the step-up power converter, substantially when the entry voltage is in compliance with a parallel-conversion criterion that is based on the entry voltage and on the measured exit voltage and is not in compliance with the first and second criteria.

5. The system according to claim 4, wherein the controller is further configured to control a maintaining of constant up-conversion rate by the step-up power converter during the concurrent conversion.

6. The system according to claim 1, wherein the controller is further configured to dynamically modify down-conversion rate of the step-down power converter during an uninterrupted down-conversion of the entry voltage.

7. The system according to claim 1, wherein the controller is further configured to dynamically modify up-conversion rate of the step-up power converter during an uninterrupted up-conversion of the entry voltage.

8. The system according to claim 1, wherein the controller is further configured to dynamically modify a conversion rate of at least one of the step-up power converter and the step-down power converter, based on a measured entry current and on a measured exit voltage, for applying power factor correction of the system.

9. The system according to claim 1, wherein the controller is configured to control duty cycles of the step-down power converter and of the step-up power converter for gradually changing the power level sourced from the power source after a sudden change in the load power level.

10. The system according to claim 1, wherein each of the step-down power converter and the step-up power converter is operable to convert in a controllable rate the entry voltage which is varying over time.

11. The system according to claim 1, wherein the power source is a three phase power source, wherein the step-up and the step-down power converters are connected to a first pair of phases of the power source.

12. The system according to claim 11, wherein the controlled electric power supply system further comprises a second step-down power converter and a second and step-up power converter which are connected to a second pair of phases of the power source that is different from the first pair; wherein the controlled electric power supply system further comprises a third step-down power converter and a third and step-up power converter which are connected to a third pair of phases of the power source that is different from the first pair and from the second pair;

wherein at least one controller of the system which is coupled to the second step-down power converter and to the second step-up power converter is configured to: (a) control down-conversion by the second step-down power converter of second entry voltage from the power source and prevent up-conversion by the second step-up power converter, substantially when the second entry voltage is larger than a second measured exit voltage and is in compliance with a third criterion that is based on the second entry voltage and on the second measured exit voltage; wherein the second measured exit voltage is measured at an exit of both second step-up power converter and the second step-down power converter; and (b) control up-conversion by the second step-up power converter of the second entry voltage and prevent down-conversion by the second step-down power converter, substantially when the second entry voltage is lower than the second measured exit voltage and is in compliance with a fourth criterion that is based on the second entry voltage and on the second measured exit voltage;

wherein at least one controller of the system which is coupled to the third step-down power converter and to the third step-up power converter is configured to: (c) control down-conversion by the third step-down power converter of third entry voltage from the power source and prevent up-conversion by the third step-up power converter, substantially when the third entry voltage is larger than a third measured exit voltage and is in compliance with a fifth criterion that is based on the third entry voltage and on the second measured exit voltage; wherein the third measured exit voltage is measured at an exit of both third step-up power converter and the third step-down power converter; and (d) control up-conversion by the third step-up power converter of the third entry voltage and prevent down-conversion by the third step-down power converter, substantially when the third entry voltage is lower than the third measured exit voltage and is in compliance with a sixth criterion that is based on the third entry voltage and on the third measured exit voltage.

13. A method for controlling electric power supply, the method comprising: controllably down converting by a step-down power converter entry voltage from a power source and preventing up-conversion by a step-up power converter, substantially when the entry voltage is larger than a measured exit voltage and is in compliance with a first criterion that is based on the entry voltage and on the measured exit voltage; wherein the measured exit voltage is measured at an exit of both step-up power converter and the step-down power converter; and controllably up converting by the step-up power converter the entry voltage and preventing down-conversion by the step-down power converter, substantially when the entry voltage is lower than the measured exit voltage and is in compliance with a second criterion that is based on the entry voltage and on the measured exit voltage;

wherein the entry voltage is in compliance with the first criterion substantially when the entry voltage exceeds a first voltage threshold that is based on the measured exit voltage and is higher than the measured exit voltage, and to determine that the entry voltage is in compliance with the second criterion substantially when the entry voltage is lower than a second voltage threshold that is based on the measured exit voltage and is lower than the measured exit voltage.

14. The method according to claim 13, further comprising storing at a storage capacitor energy arriving from the step-down power converter and from the step-up power converter, and supplying stored energy from the storage capacitor to a varying load; wherein the exit voltage is measured across the storage capacitor.

15. The method according to claim 13, further comprising controllably concurrently converting entry voltage from the power source by the step-down power converter and by the step-up power converter, substantially when the entry voltage is in compliance with a cutoff criterion that is based on the entry voltage and on the measured exit voltage, and is not in compliance with the first and the second criteria.

16. The method according to claim 15, comprising maintaining a constant up-conversion rate of the step-up power converter during the controllable concurrent conversion.

17. The method according to claim 13, comprising dynamically modifying a down-conversion rate of the step-down power converter during an uninterrupted down-conversion of the entry voltage.

18. The method according to claim 13, comprising dynamically modifying an up-conversion rate of the step-up power converter during an uninterrupted up-conversion of the entry voltage.

19. The method according to claim 13, further comprising dynamically modifying a conversion rate of at least one of the step-up power converter and the step-down power converter, based on a measured entry current and on a measured exit voltage, for applying power factor correction of the system.

20. The method according to claim 13, comprising controlling duty cycles of the step-down power converter and of the step-up power converter for gradually changing the power level sourced from the power source after a sudden change in the load power level.

21. The method according to claim 13, wherein the controllable up-conversion and the controllable down-conversion comprise converting power received from a first pair of phases of the power source which is a three phase power source.

22. The method according to claim 21, further comprising:

controllably down converting by a second step-down power converter second entry voltage from the power source and preventing up-conversion by a second step-up power converter, substantially when the second entry voltage is larger than a second measured exit voltage and is in compliance with a third criterion that is based on the second entry voltage and on the second measured exit voltage; wherein the second measured exit voltage is measured at an exit of both second step-up power converter and the second step-down power converter;

controllably up converting by the second step-up power converter the second entry voltage and preventing down-conversion by the second step-down power converter, substantially when the second entry voltage is lower than the second measured exit voltage and is in compliance with a fourth criterion that is based on the second entry voltage and on the second measured exit voltage;

controllably down converting by a third step-down power converter third entry voltage from the power source and preventing up-conversion by a third step-up power converter, substantially when the third entry voltage is larger than a third measured exit voltage and is in compliance with a fifth criterion that is based on the third entry voltage and on the second measured exit voltage; wherein the third measured exit voltage is measured at an exit of both third step-up power converter and the third step-down power converter; and controllably up converting by the third step-up power converter the third entry voltage and preventing down-conversion by the third step-down power converter, substantially when the third entry voltage is lower than the third measured exit voltage and is in compliance with a sixth criterion that is based on the third entry voltage and on the third measured exit voltage;

wherein the second step-down power converter and the second and step-up power converter are connected to a second pair of phases of the power source that is different from the first pair; wherein the third step-down power converter and the third and step-up power converter are connected to a third pair of phases of the power source that is different from the first pair and from the second pair.

23. The method according to claim 13, further comprising controllably concurrently up-converting and down-converting, by a step-up/down power converter, the entry voltage.

24. A program storage device readable by machine, tangibly embodying a program of instructions executable by the machine to perform method for controlling electric power supply, the method comprising the steps of:

controllably down converting by a step-down power converter entry voltage from a power source and preventing up-conversion by a step-up power converter, substantially when the entry voltage is larger than a measured exit voltage and is in compliance with a first criterion that is based on the entry voltage and on the measured exit voltage; wherein the measured exit voltage is measured at an exit of both step-up power converter and the step-down power converter; and controllably up converting by the step-up power converter the entry voltage and preventing down-conversion by the step-down power converter, substantially when the entry voltage is lower than the measured exit voltage and is in compliance with a second criterion that is based on the entry voltage and on the measured exit voltage, wherein the entry voltage is in compliance with the first criterion substantially when the entry voltage exceeds a first voltage threshold that is based on the measured exit voltage and is higher than the measured exit voltage, and to determine that the entry voltage is in compliance with the second criterion substantially when the entry voltage is lower than a second voltage threshold that is based on the measured exit voltage and is lower than the measured exit voltage.

25. The program storage device according to claim 24, wherein the instructions further comprise instructions for controlling concurrent conversion of entry voltage from the power source by the step-down power converter and by the step-up power converter, substantially when the entry voltage is in compliance with a cutoff criterion that is based on the entry voltage and on the measured exit voltage, and is not in compliance with the first and the second criteria.

26. The program storage device according to claim 24, wherein the instructions further comprise instructions for maintaining a constant up-conversion rate of the step-up power converter during the controllable concurrent conversion.

27. The program storage device according to claim 24, wherein the instructions further comprise instructions for dynamically modifying a down-conversion rate of the step-down power converter during an uninterrupted down-conversion of the entry voltage.

28. The program storage device according to claim 24, wherein the instructions further comprise instructions for dynamically modifying an up-conversion rate of the step-up power converter during an uninterrupted up-conversion of the entry voltage.

29. The program storage device according to claim 24, wherein the instructions further comprise instructions for dynamically modifying a conversion rate of at least one of the step-up power converter and the step-down power converter, based on a measured entry current and on a measured exit voltage, for applying power factor correction of the system.

30. The program storage device according to claim 24, wherein the instructions further comprise instructions for controlling duty cycles of the step-down power converter and of the step-up power converter for gradually changing the power level sourced from the power source after a sudden change in the load power level.

* * * * *